United States Patent
Kim et al.

(10) Patent No.: US 9,933,819 B2
(45) Date of Patent: Apr. 3, 2018

(54) PORTABLE ELECTRONIC DEVICE AND METHOD OF CONTROLLING THE SAME

(71) Applicant: LG ELECTRONICS INC., Seoul (KR)

(72) Inventors: Samsick Kim, Seoul (KR); Donghwan Yu, Seoul (KR); Seojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/791,182

(22) Filed: Jul. 2, 2015

(65) Prior Publication Data

US 2016/0070305 A1   Mar. 10, 2016

(30) Foreign Application Priority Data

Sep. 5, 2014  (KR) .................. 10-2014-0119214

(51) Int. Cl.
| | | |
|---|---|---|
| *G06F 1/16* | (2006.01) | |
| *H04M 1/02* | (2006.01) | |
| *G06F 3/041* | (2006.01) | |
| *G06F 3/0481* | (2013.01) | |
| *G06F 3/0488* | (2013.01) | |

(52) U.S. Cl.
CPC .......... *G06F 1/1652* (2013.01); *G06F 3/0412* (2013.01); *G06F 3/04817* (2013.01); *G06F 3/04883* (2013.01); *G06F 3/04886* (2013.01); *H04M 1/0268* (2013.01); *G06F 2203/04102* (2013.01); *G06F 2203/04803* (2013.01); *G09G 2380/02* (2013.01)

(58) Field of Classification Search
CPC .......................... G06F 3/017; G09G 2380/02
See application file for complete search history.

(56) References Cited

U.S. PATENT DOCUMENTS

2005/0083642 A1   4/2005  Senpuku et al.
2013/0088410 A1   4/2013  Hill et al.
(Continued)

FOREIGN PATENT DOCUMENTS

| EP | 1467539 | 10/2004 |
|---|---|---|
| EP | 2765479 | 8/2014 |
| KR | 10-2009-0030138 | 3/2009 |

OTHER PUBLICATIONS

Samsung UX Innovation Group, "Unbalance Folding Tablet," Feb. 10, 2014, pp. 1-46.*

(Continued)

*Primary Examiner* — Patrick Edouard
*Assistant Examiner* — Maheen Javed
(74) *Attorney, Agent, or Firm* — Lee, Hong, Degerman, Kang & Waimey

(57) ABSTRACT

Provided is a mobile electronic device including: a display unit that is formed to be so flexible that at least one portion of the display unit is capable of being bent, and that is configured from a first segment of which one portion and the other portion are brought into contact with each other when the display unit is bent, and a second segment that is different from the first segment and extends from the first segment; a sensing unit that detects a shape change in the first segment due to an external force; and a controller that controls information that is output to the second segment, based on the shape change.

14 Claims, 24 Drawing Sheets

(56) References Cited

U.S. PATENT DOCUMENTS

| | | |
|---|---|---|
| 2013/0127724 A1 | 5/2013 | Liu |
| 2013/0127917 A1 | 5/2013 | Kwack et al. |
| 2013/0127918 A1 | 5/2013 | Kang et al. |
| 2014/0210706 A1* | 7/2014 | Park ...................... G06F 3/0487 345/156 |
| 2015/0227286 A1* | 8/2015 | Kang .................. H04M 1/0245 715/781 |
| 2015/0311260 A1* | 10/2015 | Senda ................. H01L 51/5253 257/40 |
| 2015/0316995 A1* | 11/2015 | Tamaki ................. G06F 3/0487 345/156 |
| 2015/0378557 A1* | 12/2015 | Jeong .................... G06F 3/0488 715/835 |

OTHER PUBLICATIONS

European Patent Office Application No. 15183199.7, Search Report dated Jun. 9, 2016, 16 pages.
European Patent Office Application Serial No. 15183199.7, Search Report dated Feb. 25, 2016, 7 pages.
European Patent Office Application Serial No. 15183199.7 Office Action dated Oct. 18, 2017, 7 pages.

* cited by examiner

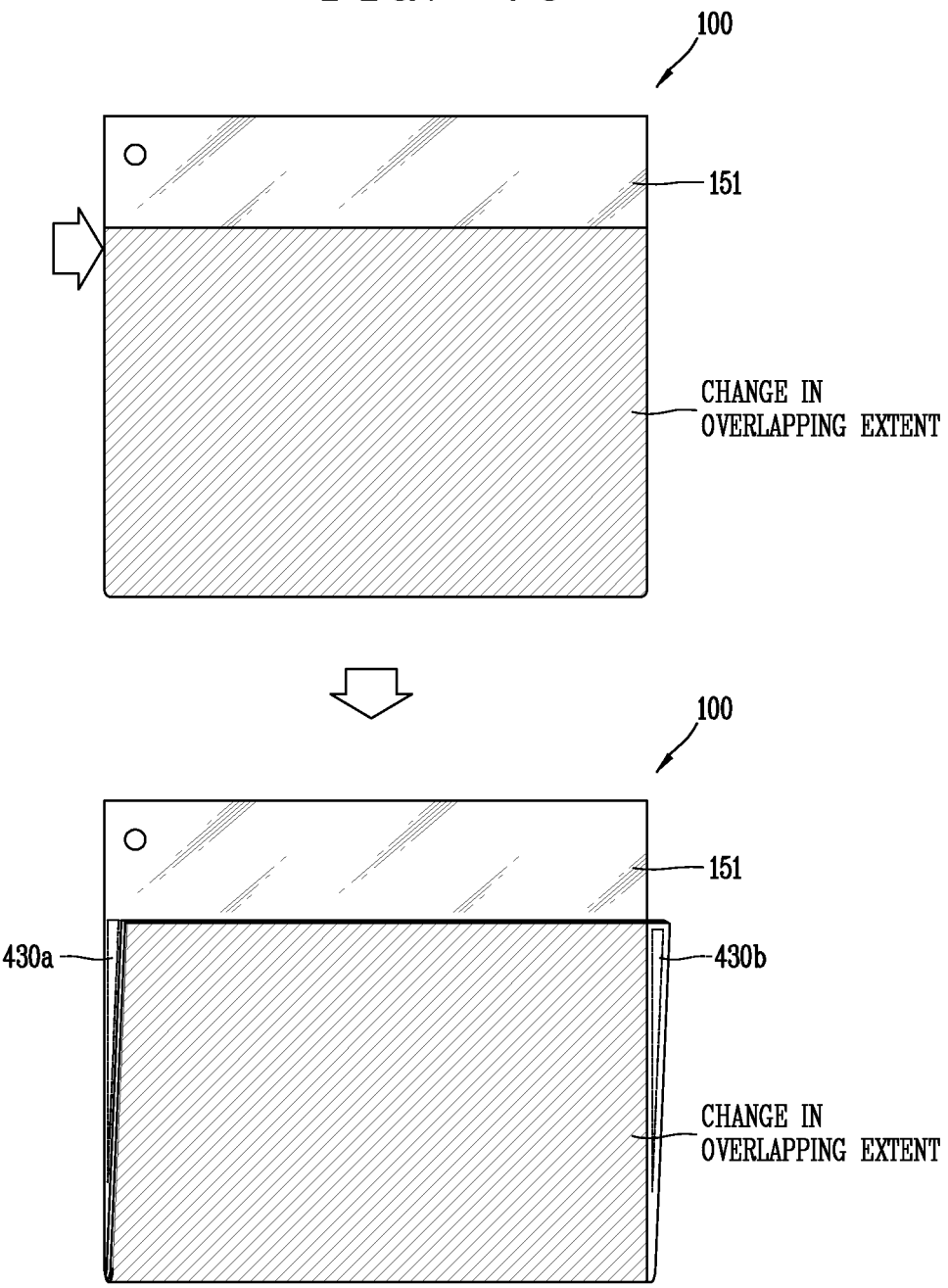

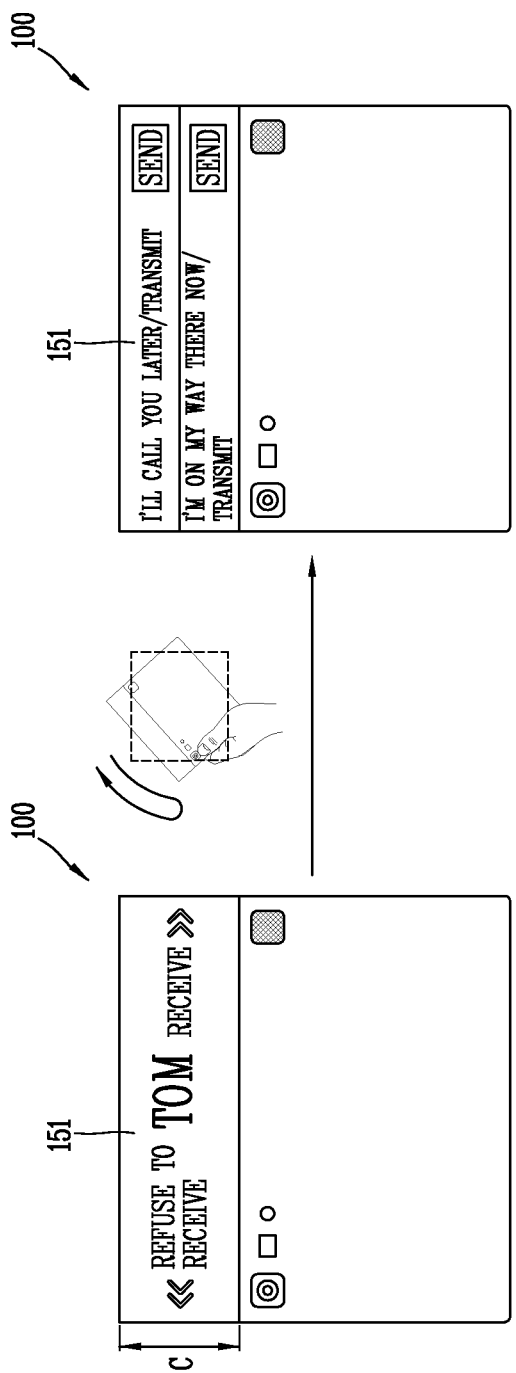

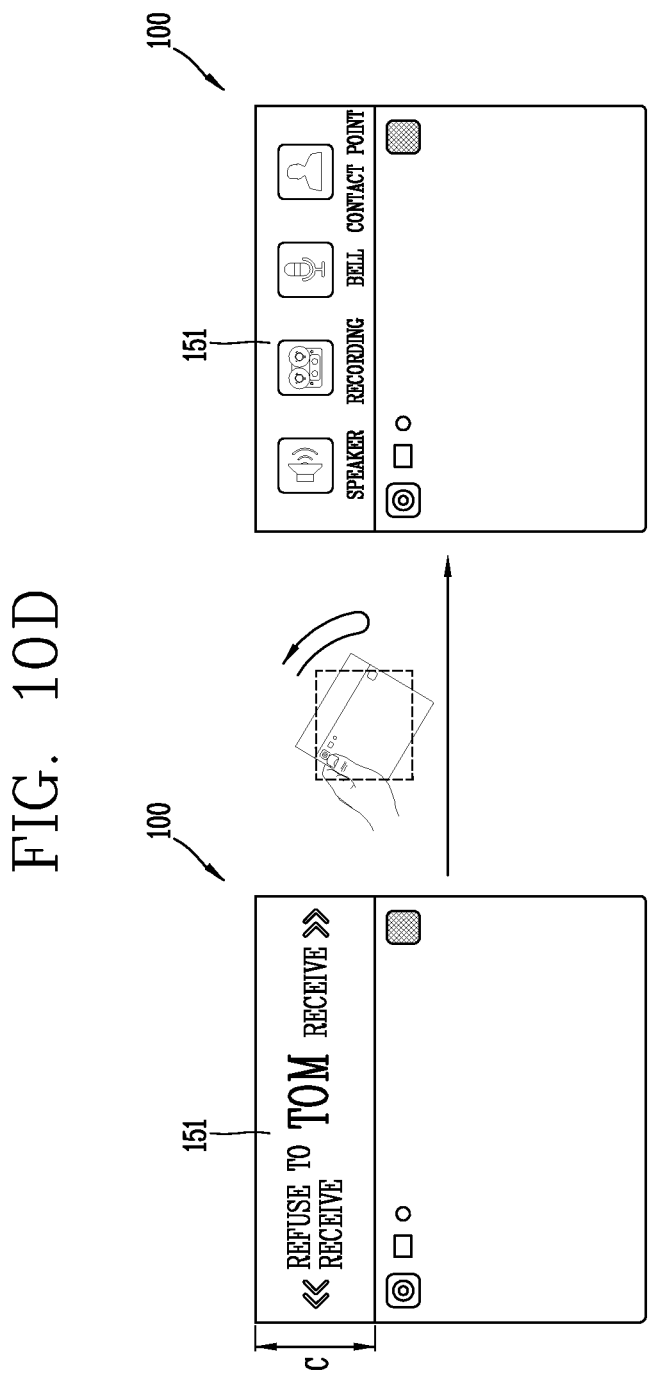

PORTABLE ELECTRONIC DEVICE AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2014-0119214, filed on Sep. 5, 2014, the contents of which are all hereby incorporated by reference herein in its entirety.

BACKGROUND OF THE DISCLOSURE

1. Field of the Disclosure

The present disclosure relates to a portable electronic device equipped with a flexible display unit and a method of controlling the portable electronic device.

2. Background of the Disclosure

A portable electronic device includes all types of devices provided with a battery and a display unit and carried by a user. The devices are configured to output information to the flexible display unit using power supplied from the battery. The portable electronic device includes a device for recording and playing moving images, a device for displaying a graphic user interface (GUI), etc., which includes a notebook, a mobile phone, glasses, a watch, a game console, etc.

Such portable electronic device has become increasingly more functional. Examples of such functions include data and voice communications, capturing images and video via a camera, recording audio, playing music files via a speaker system, and displaying images and video on a display. Some portable electronic devices include additional functionality which supports game playing, while other portable electronic devices are configured as multimedia players. More recently, portable electronic devices have been configured to receive broadcast and multicast signals which permit viewing of content such as videos and television programs.

Such portable electronic device is being evolved to have various designs. In order to satisfy a user's needs for more novel and various designs, efforts are ongoing to develop the portable electronic device of a newer type. The newer type includes structural changes and improvements to use the portable electronic device more conveniently. One of such structural changes and improvements is a portable electronic device including at least part of a display unit that can be bent or folded. In such portable electronic device, a user-friendly interface using such bending characteristic is needed.

SUMMARY OF THE DISCLOSURE

Therefore, an aspect of the detailed description is to provide to solve the problems described above and the like.

Another aspect of the detailed description is to provide a portable electronic device equipped with a new type of body using features of a display unit that is capable of being folded or bent. More specifically, the portable electronic device with a single flat surface is provided which is capable of being bent and of which one portion and the other portion are brought into contact with each other when the portable electronic device is bent.

A further aspect of the detailed description is to provide a portable electronic device that is capable of performing different functions or displaying different execution screen based on switching of states of a display unit using features of the display unit that can be folded or bent, and a method of controlling the portable electronic device.

A still further aspect of the detained description is to provide a portable electronic device that is capable of displaying information on an event occurring in a terminal based on switching of states of a display unit using features of the display unit that can be folded or bent, and a method of controlling the portable electronic device.

To achieve these and other advantages and in accordance with the purpose of this specification, as embodied and broadly described herein, there is provided a mobile electronic device including: a flexible display comprising: at least one bendable portion; a first segment having a first area; and a second segment having a second area, wherein the display is configured such that: a surface of the first segment and a surface of the second segment can be in contact with or close proximity to each other when the display is bent via the at least one bendable portion; and a first size of the first area and a second size of the second area are variable based on how the display is bent, the first size increasing when the second size decreases and the first size decreasing when the second size increases; a sensing unit configured to sense a shape change of the display; and a controller configured to: detect the shape change via the sensing unit when the first size and the second size are changed due to an external force applied to at least the first segment or the second segment; and cause the display to display information variably on at least the first segment or the second segment based on the detected shape change.

In the portable electronic device, the controller is further configured to cause the display to display an icon on the second segment, the icon informing occurrence of an event related to an application.

In the portable electronic device, the display is further configured such that the first size is decreased and the second size is increased from a base level to a first level when a first sliding gesture is applied to at least the first segment or the second segment and the controller is further configured to cause the display to display first information relating to a first event on the second segment with the second size increased to the first level, the first event associated with the application.

In the portable electronic device, the controller is further configured to cause the display to display a different amount of information on the second segment based on the second size that is decreased or increased.

In the portable electronic device, the display is further configured such that the first size is further decreased and the second size is further increased to a second level when a second sliding gesture is applied to at least the first segment or the second segment and the controller is further configured to cause the display to display second information in addition to the first information on the second segment with the second size increased to the second level, the second information relating to a second event.

In the portable electronic device, the second segment is partitioned into a first portion and a second portion; the icon is displayed in the first portion; and the first information is displayed in the second portion.

In the portable electronic device, the controller is further configured to cause the display to display an execution screen of the application on the second segment when the second size is increased to a level that is equal to or greater than a reference size.

In the portable electronic device, the display is further configured such that the second size is decreased to the base level when a second sliding gesture is applied to at least the first segment or the second segment after the first sliding gesture and the controller is further configured to cause the display to no longer display the first information on the second segment with the second size decreased to the base level.

In the portable electronic device, the sensing unit is further configured to sense inclination of the first segment; and the controller is further configured to: detect the inclination via the sensing unit when a first portion of the first segment is inclined with respect to a second portion of the first segment and cause the display to display the information on the second segment based on the detected inclination.

In the portable electronic device, the information is displayed variably on the second segment according to a direction of the inclination.

In the portable electronic device, the information is a call receiving screen displayed in response to a call received from another device and the controller is further configured to accept or refuse the call based on a direction of the inclination detected while the call receiving screen is displayed on the second segment, the call accepted when the direction is a first direction and the call refused when the direction is a second direction that is substantially opposite of the first direction.

In the portable electronic device, the information displayed on the second segment comprises a plurality of icons alerting multiple events related to a plurality of applications, each of the plurality of icons informing an event related to a corresponding one of the plurality of applications and the controller is further configured to cause the display to selectively display at least one of a plurality of information relating to at least one of the multiple events on the second segment based on the direction of the inclination.

The portable electronic device may further comprise a wireless communication unit configured to receive a signal, wherein the controller is further configured to cause the display to display at least a portion of the information received via the wireless communication unit on the second segment.

In the portable electronic device, the controller is further configured to cause illumination of at least the first segment or the second segment when the shape change is detected while the display is in an inactivated state in which neither the first segment nor the second segment is illuminated such that the display is switched to an activated state in which at least the first segment or the second segment is illuminated.

In the portable electronic device, a position of the first segment in the inactivated state and a position of the second segment in the activated state are changeable according to the detected shape change.

In the portable electronic device, the first segment is configured from a first portion and a second portion of the display, the second portion is formed to be rotatable about a border portion that is connected to one end of the first portion such that the second portion covers the first portion when the second portion is rotated or the second portion does not cover the first portion when the second portion is not rotated and the display further comprises a third portion connected to the other end of the first portion.

In the portable electronic device, the shape change occurs in the first segment when a shape of the second portion is changed.

To achieve these and other advantages and in accordance with the purpose of this specification, as embodied and broadly described herein, there is provided a method of controlling a mobile electronic device comprising a flexible display, wherein the flexible display comprises at least one bendable portion, a first segment having a first area, and a second segment having a second area, the display is configured such that: a surface of the first segment and a surface of the second segment can be in contact with or close proximity to each other when the display is bent via the at least one bendable portion and a first size of the first area and a second size of the second area are variable based on how the display is bent, the first size increasing when the second size decreases and the first size decreasing when the second size increases and the method comprises: detecting a shape change of the display when the first size and the second size are changed due to an external force applied to at least the first segment or the second segment and displaying information variably on at least the first segment or the second segment based on the detected shape change.

The method may further comprise displaying an icon on the second segment, the icon informing an event related to an application, decreasing the first size and increasing the second size when a sliding gesture is applied to at least the first segment or the second segment and displaying first information relating to a first event on the second segment with the increased second size, the first event associated with the application.

In the method, the information comprises a plurality of icons alerting multiple events related to a plurality of applications, each of the plurality of icons informing an event related to a corresponding one of the plurality of applications, and the method further comprises: detecting inclination of the first segment when a first portion of the first segment is inclined with respect to a second portion of the first segment and selectively displaying second information relating to at least one of the multiple events on the second segment based on a direction of the inclination.

Effects of the portable electronic device and the method of controlling the portable electronic device according to the present invention are described below.

According to at least one of the embodiments of the present invention, in a state where one portion of one segment of a display unit and the other portion of the one segment are brought into contact with each other, based on a shape change in the one portion, information that is output to a second segment of the display unit is controlled and thus a new type of user convenience is provided.

In addition, according to at least one of the embodiments of the present invention, an operation of alerting an event and outputting detailed information is controlled using a shape change that occurs in one portion of the bent display unit, and thus visual information can be provided to a user in various ways in a bent state of the display unit. In addition, information relating to an event that also occurs in a state where a segment for display is inactivated can be provided through the segment for display in various ways.

In addition, various operations are performed according to a state where a display unit is bent, and thus a new type of user convenience can be provided.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 4A to 4C are diagrams for describing various methods of detecting a shape change in the portable electronic device according to the present invention;

FIGS. 10A to 10D are diagrams illustrating embodiments associated with information reception;

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A portable electronic device in the present description may include a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, the present invention may be also applicable to a fixed terminal such as a digital TV, a desktop computer and a digital signage, except for specific configurations for mobility.

Figure 1:
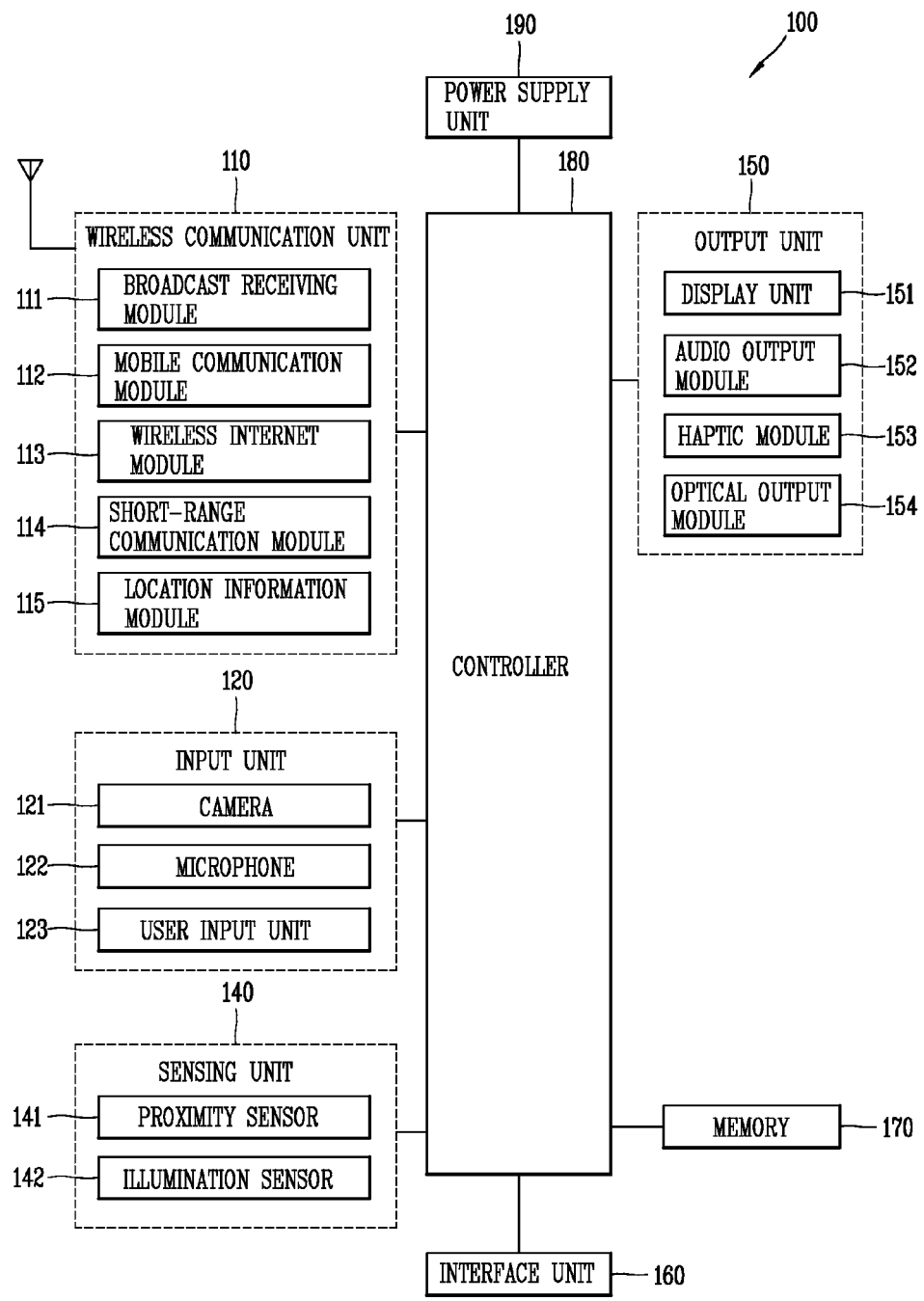
FIG. 1 is a block diagram for describing a portable electronic device according to the present invention.

FIG. 1 is a block diagram of a portable electronic device according to an embodiment of the present invention.

The portable electronic device 100 is shown having components such as a wireless communication unit 110, an input unit 120, an electromagnetic wave generation unit 130, a sensing unit 140, an output unit 150, an interface unit 160, a memory 170, a controller 180, and a power supply unit 190. Implementing all of the illustrated components of FIG. 1 is not a requirement, and greater or fewer components may alternatively be implemented.

The wireless communication unit 110 typically includes one or more modules which permit communications such as wireless communications between the portable electronic device 100 and a wireless communication system, communications between the portable electronic device 100 and another portable electronic device, communications between the portable electronic device 100 and an external server. Further, the wireless communication unit 110 typically includes one or more modules which connect the portable electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The electromagnetic wave generation unit 130 generates electromagnetic waves having a linear characteristic, as a trigger signal for controlling an external device positioned at a short distance. More specifically, the electromagnetic wave generation unit 130 generates electromagnetic waves having a specific frequency, under control of the controller 180. That is, electromagnetic waves generated by the electromagnetic wave generation unit 130 may have various frequencies under control of the controller 180. The electromagnetic waves may include various data for controlling an external device. More specifically, the electromagnetic waves may include a request message requesting information related to an external device, or an identifier for security.

The sensing unit 140 is typically implemented using one or more sensors configured to sense internal information of the portable electronic device, the surrounding environment of the portable electronic device, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The portable electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a flexible display unit 151, an audio output module 152, a haptic module 153, and an optical output module 154.

The flexible display unit 151 may have an inter-layered structure or an integrated structure with a touch sensor in order to facilitate a touch screen. The touch screen may provide an output interface between the portable electronic device 100 and a user, as well as function as the user input unit 123 which provides an input interface between the portable electronic device 100 and the user. The flexible display unit 151 is generally configured to output information processed in the portable electronic device 100. For example, the flexible display unit 151 may display execution screen information of an application program executing at the portable electronic device 100 or user interface (UI) and graphic user interface (GUI) information in response to the execution screen information.

The flexible display unit 151 outputs information processed in the portable electronic device 100. The flexible display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The flexible display unit 151 may be implemented using two mobile terminals, which can implement the same or different display technology. For instance, a plurality of the flexible display units 151 may be arranged on one side, either spaced apart from each other, or these devices may be integrated, or these devices may be arranged on different surfaces.

The flexible display unit 151 may also include a touch sensor which senses a touch input received at the flexible display unit 151. When a touch is input to the flexible display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The flexible display unit 151 may also form a touch screen together with the touch sensor. Here, the touch screen may serve as the user input unit 123 (see FIG. 1). Therefore, the touch screen may replace at least some of the functions of the first manipulation unit 123a.

The interface unit 160 serves as an interface with various types of external devices that can be coupled to the portable electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 may perform assorted control functions associated with a connected external device, in response to the external device being connected to the interface unit 160.

The memory 170 is typically implemented to store data to support various functions or features of the portable electronic device 100. For instance, the memory 170 may be configured to store application programs executed in the portable electronic device 100, data or instructions for operations of the portable electronic device 100, and the like. Some of these application programs may be downloaded from an external server via wireless communication. Other application programs may be installed within the portable electronic device 100 at time of manufacturing or shipping, which is typically the case for basic functions of the portable electronic device 100 (for example, receiving a call, placing a call, receiving a message, sending a message, and the like). It is common for application programs to be stored in the memory 170, installed in the portable electronic device 100, and executed by the controller 180 to perform an operation (or function) for the portable electronic device 100.

The controller 180 typically functions to control overall operation of the portable electronic device 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the portable electronic device 100. The power supply unit 190 may include a battery, and the battery may be configured to be embedded in the body of the portable electronic device, or configured to be detachable from the body of the portable electronic device.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the portable electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the portable electronic device 100 and a wireless communication system, communications between the portable electronic device 100 and another portable electronic device 100, or communications between the portable electronic device and a network where another portable electronic device 100 (or an external server) is located, via wireless area networks. One example of the wireless area networks is a wireless personal area networks.

In some embodiments, another portable electronic device (which may be configured similarly to portable electronic device 100) may be a wearable device, for example, a smart watch, a smart glass or a head mounted display (HMD), which can exchange data with the portable electronic device 100 (or otherwise cooperate with the portable electronic device 100). The short-range communication module 114 may sense or recognize the wearable device, and permit communication between the wearable device and the portable electronic device 100.

In addition, when the sensed wearable device is a device which is authenticated to communicate with the portable electronic device 100, the controller 180, for example, may cause transmission of data processed in the portable electronic device 100 to the wearable device via the short-range communication module 114. Hence, a user of the wearable device may use the data processed in the portable electronic device 100 on the wearable device. For example, when a call is received in the portable electronic device 100, the user may answer the call using the wearable device. Also, when a message is received in the portable electronic device 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the portable electronic device uses a GPS module, a position of the portable electronic device may be acquired using a signal sent from a GPS satellite. As another example, when the portable electronic device uses the Wi-Fi module, a position of the portable electronic device can be acquired based on information related to a wireless access point (AP) which transmits or receives a wireless signal to or from the Wi-Fi module.

The input unit 120 may be configured to permit various types of input to the portable electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the flexible display unit 151 or stored in memory 170. In some cases, the cameras 121 may be arranged in a matrix configuration to permit a plurality of images having various angles or focal points to be input to the portable electronic device 100. As another example, the cameras 121 may be located in a stereoscopic arrangement to acquire left and right images for implementing a stereoscopic image.

The microphone 122 is generally implemented to permit audio input to the portable electronic device 100. The audio input can be processed in various manners according to a function being executed in the portable electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the portable electronic device 100. The user input unit 123 may include one or more of a mechanical input element (for example, a key, a button located on a front and/or rear surface or a side surface of the portable electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the portable electronic device at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the portable electronic device, surrounding environment information of the portable electronic device, user information, or the like. The controller 180 generally cooperates with the sending unit 140 to control operation of the portable electronic device 100 or execute data processing, a function or an operation associated with an application program installed in the portable electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the portable electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the portable electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the flexible display unit 151, or convert capacitance occurring at a specific part of the flexible display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the flexible display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the portable electronic device 100 or a currently executed application program, for example.

The touch sensor may be configured to sense a touch input using a different method, in an activated or deactivated state of the flexible display unit 151. The different method may be related to an activation period of the touch sensor. More specifically, the touch sensor may be activated at a different period according to whether the flexible display unit 151 has been activated or not. That is, the touch sensor may have a different activation period according to whether the flexible display unit 151 has been activated or not, and may sense a touch input applied thereto.

For instance, in a deactivated state of the flexible display unit 151, the touch sensor may be activated with a preset period. In this instance, the preset period may be a time period more than 0. Further, in an activated state of the flexible display unit 151, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the flexible display unit 151 is in an activated state (hereinafter, will be referred to as an active mode), the touch sensor may wait for input of taps onto the flexible display unit 151, while maintaining an activated state. Further, if the flexible display unit 151 is in a deactivated state (hereinafter, will be referred to as a doze mode), the touch sensor may be activated at preset periods.

When the preset period of the touch sensor is shorter, a sensing speed with respect to taps applied onto the flexible display unit 151 is higher. However, in this instance, a power consumption amount of the touch sensor may be increased. Further, when the preset period of the touch sensor is longer, a sensing speed with respect to taps applied onto the flexible display unit 151 may be lower, while a power consumption amount of the touch sensor is decreased.

Thus, the preset period may be set so that a sensing speed with respect to taps applied onto the flexible display unit 151 is high enough not to be recognized by a user, and so that power consumption can be reduced. For instance, the preset period may be set so that the touch sensor in a deactivated state can be activated about 20 times (1 Hz) per second.

While the flexible display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the flexible display unit 151, by several times. That is, the touch sensor may be activated with a different period, according to whether the flexible display unit 151 is in an activated state or a deactivated state.

In a doze mode where the flexible display unit 151 is in a deactivated state and the touch sensor is periodically activated, if a preset touch input (e.g., a first touch input and a second touch input consecutively knocking-on a predetermined region within a predetermined time) is sensed by the touch sensor, the controller 180 can convert the doze mode into an activate mode where the flexible display unit and the touch sensor are activated.

The touch sensor may be driven at a different period based on a state of the flexible display unit 151. For instance, when the flexible display unit 151 is in a closed state, a doze mode may be executed. Further, when a closed state is converted into an open state, an active mode may be executed. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor 142 and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 121 is provided with at least one of a first camera 121a formed on a front surface of the body, and a second camera 121b formed on a rear surface of the body. The first camera 121a is configured to process an image frame of still images or moving images acquired by an image sensor in a capturing mode or a video call mode. The processed image frame may be displayed on the flexible display unit 151, and may be stored in the memory 170.

The second camera 121b may include a plurality of lenses arranged along at least one line. Such lenses may be arranged in the form of matrices. Such camera may be referred to as an 'array camera'. If the second camera 121b is configured as an array camera, images can be captured in various manners by using a plurality of lenses, and images of better quality can be obtained. A flash may be additionally disposed close to the second camera 121b. The flash illuminates light toward an object when capturing the object with the second camera 121b.

The electromagnetic wave generation unit 130 may be disposed close to the second camera 121b. When the second camera 121b is activated, the electromagnetic wave generation unit emits generated electromagnetic waves. The flexible display unit 151 is generally configured to output information processed in the portable electronic device 100. For example, the flexible display unit 151 may display execution screen information of an application program executing at the portable electronic device 100 or user interface (UI) and graphic user interface (GUI) information in response to the execution screen information.

In some embodiments, the flexible display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the portable electronic device 100. The audio output module 152 may also be implemented as a receiver, a speaker, a buzzer, or the like.

The audio output module 152 includes at least one of a first audio output module and a second audio output module. The first audio output module may be implemented in the form of a receiver, and the second audio output module may be implemented in the form of a loud speaker to output voice audio, alarm sounds, multimedia audio reproduction, and the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the portable electronic device 100.

An optical output module 154 can output a signal for indicating an event generation using light of a light source. Examples of events generated in the portable electronic device 100 may include success or failure of a user authentication, message reception, call signal reception, a missed call, an alarm, a schedule notice, an email reception, information reception through an application, and the like. Upon detection of a user's event check, the controller 180 can control the optical output unit 154 so that output of light can be terminated.

A signal output by the optical output module 154 may be implemented so the portable electronic device emits monochromatic light or light with a plurality of colors. The signal output may be terminated as the portable electronic device senses that a user has checked the generated event, for example.

The interface unit 160 serves as an interface for external devices to be connected with the portable electronic device 100. For example, the interface unit 160 can receive data transmitted from an external device, receive power to transfer to elements and components within the portable electronic device 100, or transmit internal data of the portable electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the portable electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the portable electronic device 100 is connected with an external cradle, the interface unit 160 can serve as a passage to allow power from the cradle to be supplied to the portable electronic device 100 or may serve as a passage to allow various command signals input by the user from the cradle to be transferred to the portable electronic device there through. Various command signals or power input from the cradle may operate as signals for recognizing that the portable electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The portable electronic device 100 may also be operated in relation to a network storage device that performs the storage function of the memory 170 over a network, such as the Internet.

The controller 180 can typically control the general operations of the portable electronic device 100. For example, the controller 180 can set or release a lock state for restricting a user from inputting a control command with respect to applications when a status of the portable electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the portable electronic device 100. The power supply unit 190 may include a battery, which is typically rechargeable or be detachably coupled to the body of the portable electronic device for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the portable electronic device 100 can also be provided on the portable electronic device 100. As one example of an accessory, a cover or pouch for covering or accommodating at least one surface of the portable electronic device 100 may be provided. The cover or pouch may cooperate with the flexible display unit 151 to extend the function of the portable electronic device 100. Another example of the accessory is a touch pen for assisting or extending a touch input to a touch screen. Various embodiments described herein may be implemented in a computer-readable medium, a machine-readable medium, or similar medium using, for example, software, hardware, or any combination thereof.

Figure 2A:
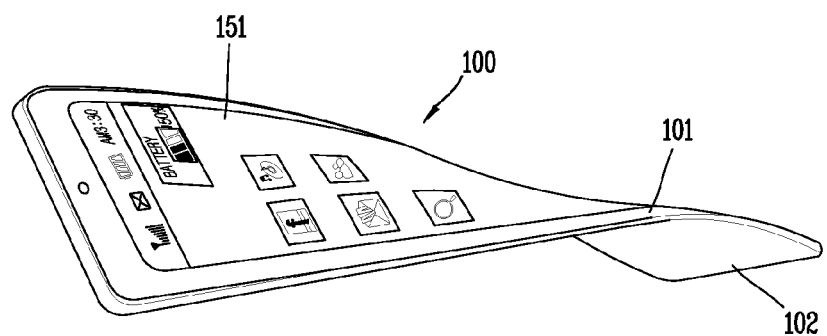
FIGS. 2A and 2B are diagrams illustrating an example of the portable electronic device according to the present invention when viewed from different directions.
Figure 2B:
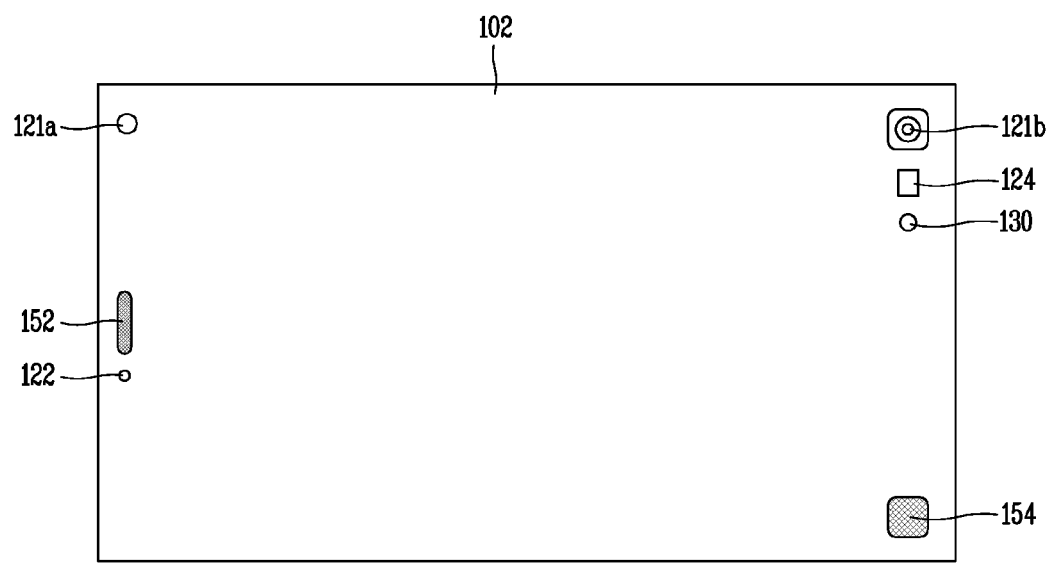

Referring now to FIGS. 2A and 2B, the portable electronic device 100 having a bar-type body is described. However, the portable electronic device 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device (for example, bar-type, watch-type, glasses-type, and the like). However, such teachings with regard to a particular type of portable electronic device will generally apply to other types of mobile terminals as well.

The body of the portable electronic device may be understood to indicate the portable electronic device 100 by regarding the portable electronic device 100 as at least one assembly.

The portable electronic device 100 will generally include a case (for example, frame, housing, cover, and the like) forming the appearance of the terminal. In this embodiment, the case is formed using a front case 101 and a rear case. Various electronic components are incorporated into a space formed between the front case 101 and the rear case. At least one middle case may be additionally positioned between the front case 101 and the rear case.

The case 101 may be configured to be transformable together with the flexible display unit 151 by an external force, taking into account characteristics of the flexible display unit 151. That is, the flexible display unit 151 is formed to be bendable or foldable together with the case 101. For instance, the case 101 may be formed of a transformable material such as plastic, thin glass, fiber, thin metal (e.g., aluminum, etc.), textile and silicon, or a combination thereof.

The case 101 may be partially formed of a dielectric material or a low conductive material, and at least part of a structure of the case 101 may be formed of metal. The flexible display unit 151 may be disposed on a front surface of the body of the portable electronic device to output information. As shown, the flexible display unit 151 may be mounted to the case 101 to form the front surface of the body.

In some embodiments, electronic components may also be mounted to the rear case. Examples of such electronic components include a detachable battery, an identification module, a memory card, and the like. A rear cover is shown covering the electronic components, and this cover may be detachably coupled to the rear case. Therefore, when the rear cover is detached from the rear case 102, the electronic components mounted to the rear case 102 are externally exposed. In some embodiments, the rear cover may include an opening for externally exposing a camera 121 or an audio output unit 152.

As an alternative to the example in which the plurality of cases form an inner space for accommodating components, the portable electronic device 100 may be configured such that one case forms the inner space. In this example, a portable electronic device 100 having a uni-body is formed so synthetic resin or metal extends from a side surface to a rear surface.

If desired, the portable electronic device 100 may include a waterproofing unit for preventing introduction of water into the body of the portable electronic device. For example, the waterproofing unit may include a waterproofing member which is located between a window and the front case 101, between the front case 101 and the rear case, or between the rear case and the rear cover, to hermetically seal an inner space when those cases are coupled. The flexible display unit 151, the audio output unit 152, the optical output unit 154, the camera 121, the microphone 122, etc. may be provided at the portable electronic device 100.

As shown in FIGS. 2A and 2B, the flexible display unit 151 is arranged on a front surface of the body of the portable electronic device 100, and the first camera 121a, the second camera 121b, the audio output unit 152, the microphone 122, the rear input units, and the optical output unit 154 are arranged on a rear surface of the body of the portable electronic device 100. However, alternative arrangements are possible and within the teachings of the instant invention. Some components may be omitted or rearranged.

As shown in FIG. 2A, the flexible display unit 151 may be arranged on a front surface of the portable electronic device 100. The flexible display unit 151 is configured to output information processed in the portable electronic device 100. For instance, the flexible display unit 151 may display execution screen information of an application program executing at the portable electronic device 100 or user interface (UI) and graphic user interface (GUI) information in response to the execution screen information.

The flexible display unit 151 is configured to be deformable by an external force. This deformation may include any of curving, bending, folding, twisting, rolling, and combinations thereof. The deformable display unit 151 may also be referred to as a 'flexible display unit' or 'bendable display unit'. In some implementations, the flexible display unit 151 may include a general flexible display, electronic paper (also known as e-paper), and combinations thereof. That is, the flexible display unit 151 means a display unit of which at least part is foldable in a flexible manner.

The flexible display is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 151 is not deformed (for example, in a state with an infinite radius of curvature and referred to as a first state), a display region of the flexible display unit 151 includes a generally flat surface. When the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

The flexible display unit 151 may be formed of material of a plurality of layers. If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. The touch sensor may be arranged on a substrate of the display, or may be provided in the display.

The flexible display unit 151 may form a touch screen together with a touch sensor. In this instance, the touch screen may serve as the user input unit 123. A cause to generate a state conversion of the flexible display unit 151 is not limited to an external force. For instance, when the flexible display unit 151 is in a first state, the flexible display unit 151 may be deformed to a second state by a user's command or application command. More specifically, the portable electronic device 100 may include a driving unit. If the current condition corresponds to a preset condition, the first state may be changed into the second state by the driving unit, not by an external force.

One option is to configure the portable electronic device 100 according to an embodiment of the present invention to include a deformation sensor which senses the deforming of the flexible display unit 151. The deformation sensor may be included in the sensing unit 140.

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Alternatively, such information may include various information sensible by bending of the flexible display unit 151.

In some embodiments, the controller 180 or other component can change information displayed on the flexible display unit 151, or generate a control signal for controlling a function of the portable electronic device 100, based on the information related to the deforming of the flexible display unit 151. Such information is typically sensed by the deformation sensor.

For instance, if the flexible display unit 151 is bent in correspondence to an external force, the controller 180 can rearrange, separate, synthesize or change a curvature of a screen image which has been displayed on the flexible display unit 151, according to a bent direction of the flexible display unit, a bent degree, and a restoration acceleration. More specifically, if the flexible display unit 151 is inward bent by an external force, the controller 180 can control screen images displayed on the flexible display unit, to be adjacent to each other. Further, if the flexible display unit 151 is outward bent by an external force, the controller 180 can control screen images displayed on the flexible display unit, to be distant from each other. The portable electronic device 100 is shown having a case 101 for accommodating the flexible display unit 151.

As shown in FIG. 2B, as another example of the user input unit (not illustrated), one rear input unit or a plurality of rear input units may be located on the rear surface of the case 101 of the portable electronic device. The rear input units can be manipulated by a user to provide input to the portable electronic device 100. The input may be used in a variety of different ways. For example, the rear input unit may be used by the user to provide an input for power on/off, start, end, scroll, control volume level being output from the audio output unit 152, switch to a touch recognition mode of the flexible display unit 151, and the like. The rear input unit may be configured to permit a touch input, a push input, or combinations thereof.

The rear input units may be located to overlap the flexible display unit 151 of the front side in a thickness direction of the body of the portable electronic device. As one example, the rear input units may be located on a rear surface of the portable electronic device 100 in a flat state of the case 101. However, when the case 101 is bent so that a left end and a right end thereof can face each other, the rear input units may be located on a front surface of the portable electronic device 100. However, the present invention is not limited to this. That is, a position and the number of the rear input units may be variable.

As a further alternative, the portable electronic device 100 may include a finger scan sensor which scans a user's fingerprint. The controller 180 can then use fingerprint information sensed by the finger scan sensor as part of an authentication procedure. The finger scan sensor may also be installed in the flexible display unit 151 or implemented in the user input units. The microphone 122 is shown located at an end of the portable electronic device 100, but other locations are possible. If desired, multiple microphones may be implemented, with such an arrangement permitting the receiving of stereo sounds.

The second camera 121b is shown located at the rear side of the body of the portable electronic device. When the first camera 121a is arranged on a front surface of the body, the second camera 121b has an image capturing direction that is substantially opposite to the image capturing direction of the first camera unit 121a.

The first camera 121a may be arranged at an opening formed at part of the flexible display unit 151. Alternatively, the first camera 121a may be arranged at an opening formed at part of the case disposed on a front surface. The second camera 121b is configured to process an image frame of still images or moving images acquired by an image sensor in a capturing mode or a video call mode. The processed image frame may be displayed on the flexible display unit 151, and may be stored in the memory 170.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities. A flash 124 is shown adjacent to the second camera 121b. When an image of a subject is captured with the second camera 121b, the flash 124 may illuminate the subject.

An electromagnetic wave generation unit 130 may be disposed close to the second camera 121b. When the second camera 121b is activated, the electromagnetic wave generation unit 130 emits generated electromagnetic waves. At least one antenna for wireless communication may be located on the body of the portable electronic device. The antenna may be installed in the body of the portable electronic device or formed by the case. For example, an antenna which configures a part of the broadcast receiving module 111 may be retractable into the body of the portable electronic device. Alternatively, an antenna may be formed using a film attached to an inner surface of the rear cover, or a case that includes a conductive material.

A battery located in the portable electronic device 100 may also be deformable in cooperation with the flexible display unit 151, taking into account the characteristic of the flexible display unit 151. One technique to implement such a battery is to use a stack and folding method of stacking battery cells.

Further, the interface unit 160 may be disposed on a side surface of the body of the portable electronic device. The interface unit 160 may serve as a path allowing the portable electronic device 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the portable electronic device 100. The interface unit 160 may be implemented in the form of a socket for accommodating an external card, such as Subscriber Identification Module (SIM), User Identity Module (UIM), or a memory card for information storage.

A battery may receive power via a power source cable connected to the interface unit 160. Also, the battery can be recharged in a wireless manner using a wireless charger. Wireless charging may be implemented by magnetic induction or electromagnetic resonance.

Corresponding to the fact that a flexible display unit 151 changes in shape, the controller 180 of a portable electronic device 100 according to one embodiment of the present invention, which includes at least one of the constituent elements described above, determines what a shape the flexible display unit 151 takes on now and thus detects that the flexible display unit 151 changes in shape. Then, the controller 180 controls information that is to be displayed on the flexible display unit 151, corresponding to the change in the shape of the flexible display unit 151. Accordingly, the information that is to be output to the flexible display unit 151 is determined depending on the change in the shape of the flexible display unit 151.

A construction of the flexible display unit 151 and a method in which the information to be displayed on the flexible display unit 151 is controlled in such a manner to correspond to the change in the shape of the flexible display unit 151 will be described in more detail below referring to the accompanying drawings.

First, geometric features of the construction of the flexible display unit 151 in the portable electronic device according to one embodiment of the present invention are described.

Figure 3A:
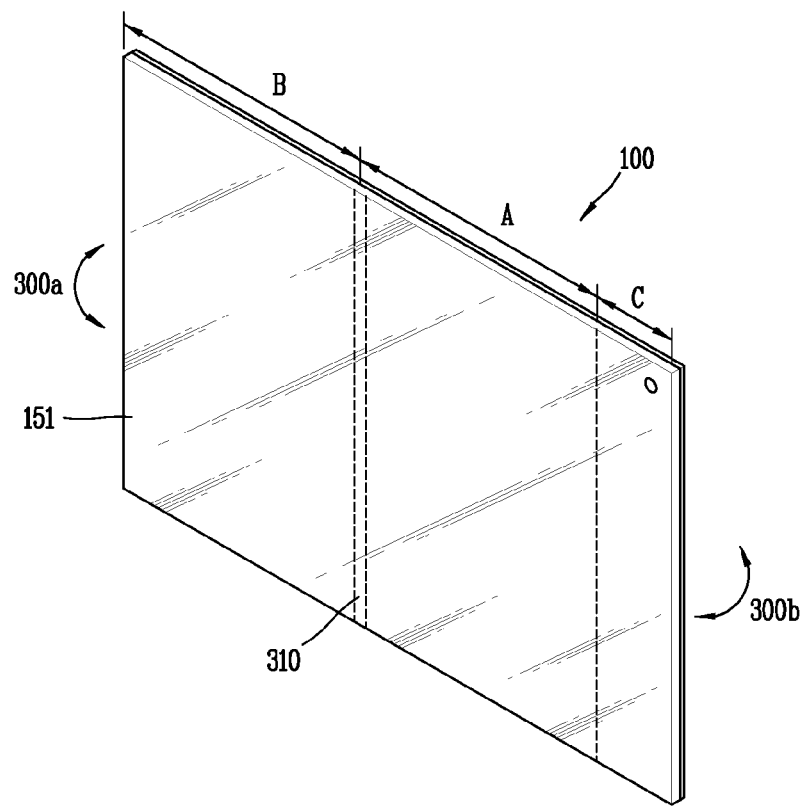
FIG. 3A is a perspective diagram of one example of a flexible display unit in the portable electronic device according to the present invention, which has a single flat surface, when viewed from the front.
Figure 3B:
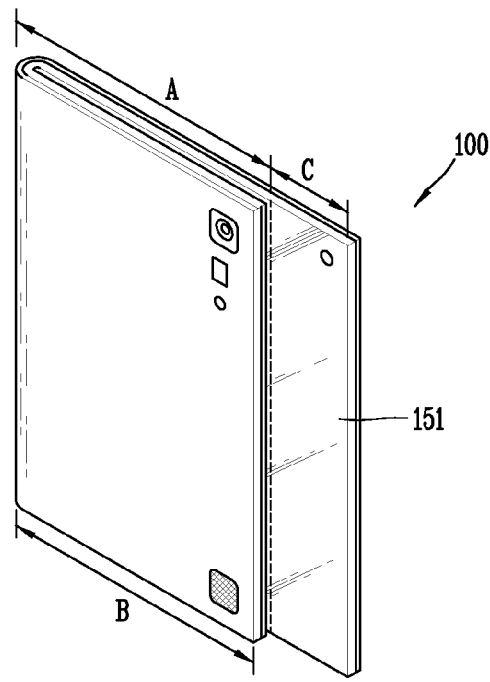
FIGS. 3B to 3D are perspective diagrams of various examples of the flexible display unit 151 in the portable electronic device illustrated in FIG. 3A, which takes on a bent shape, when viewed from the front.
Figure 3C:
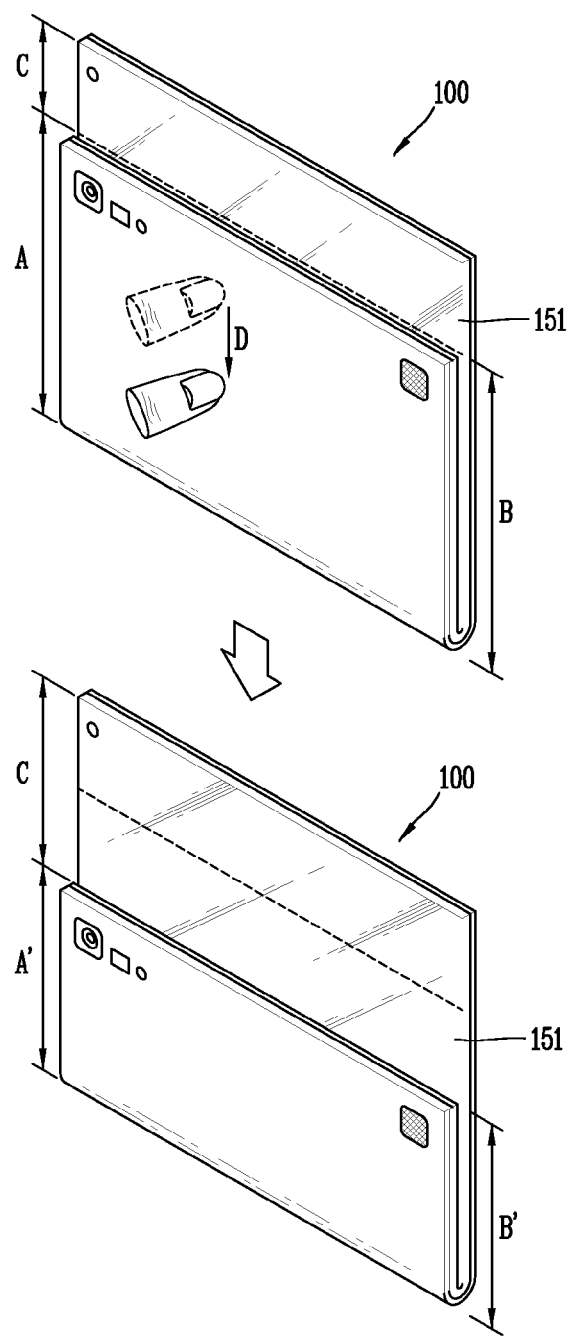
Figure 3D:
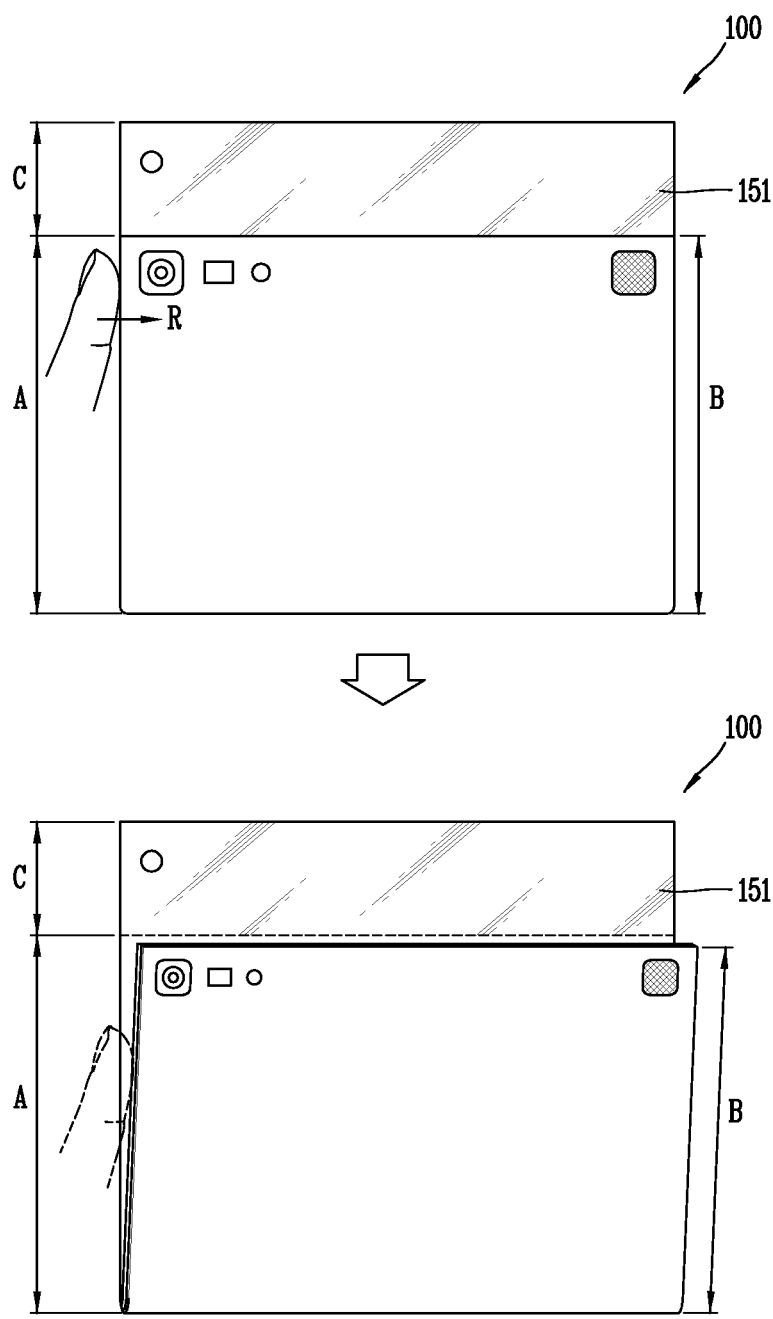

FIG. 3A is a perspective diagram of one example of the flexible display unit 151 in the portable electronic device according to the present invention, which has a single flat surface, when viewed from the front. FIGS. 3B to 3D are perspective diagrams of various examples of the flexible display unit 151 in the portable electronic device illustrated in FIG. 3A, which takes on a bent shape, when viewed from the front.

Referring to the drawings, the portable electronic device 100 includes a case 101 that makes up the exterior appearance, a display unit 151 that is arranged in the front, and a sensing unit (or a changing-shape detection unit) that detects a change in the shape of the display unit 151.

The flexible display unit 151 is capable of being bent or folded.

Here, being folded means a state where a radius of curvature of a curve at one point on a body of the portable electronic device remains smaller than a reference value and, simply stated, corresponds to a folded state. In the folded state, opposite ends of a screen of the display unit are brought into contact with each other or are positioned in close proximity to each other.

Otherwise, being bent means a state where a radius of curvature of a curve at one point of the body of the portable electronic device remains greater than the reference value and, simply stated, corresponds to a curved state.

In addition, being folded and being bent may be distinguished from each other depending on the extent to which the body of the portable electronic device is forced from a straight shape into an angular shape. For example, when the portable electronic device is forced into an angular shape to a greater angle than a predetermined angle, this is defined as being folded and when the portable electronic device is forced into an angular shape to the predetermined angle or smaller, this is defined as being bent. In addition, although the portable electronic device is forced into the angular shape to a greater angel than the predetermined angle, if a radius of curvature is greater than the reference value, this may be defined as being bent.

However, for convenience in description, being bent and being folded are hereinafter collectively referred to as being bent.

The body of the portable electronic device, that is, at least one of the display unit 151 and the case 101 includes a bend portion 310. The body of the portable electronic device can be bent along the bend portion 310 serving as a bend axis, resulting in one end of the portable electronic device rotating about the bend portion 310. For example, a left end of the portable electronic device rotates about the first bend portion in a first arrow-indicated direction 300a. Although not illustrated in the drawings, a right end of the portable electronic device rotates about a second bend portion (not illustrated) in a second arrow-indicated direction 300b. That is, a dual foldable display is provided that can be bent along the first and second bend portions serving as the bend axes.

The bend portion 310 is defined as a portion that is formed along an imaginary longitudinal line and/or a transverse line that connect points of stress concentration whose resistance values are greater than a reference value, among points of stress concentration.

The bend portion is set in advance to be one among portions of the portable electronic device. That is, a user bends the body of the portable electronic device along the predetermined bend portion serving as the bend axis.

On the other hand, instead of being set in advance, the bend region may be formed in various ways by pressing one segment of the body of the portable electronic device over another segment of the body of the portable electronic device with an external force. More specifically, the bend portion is formed, by an external force, on an arbitrary portion of the portable electronic device along a longitudinal direction or a traverse direction, and the body of the portable electronic device can be bent along the bending portion formed by the external force. That is, the bend portion varies according to the external force.

For convenience in description, one example in which, according to the present invention, one bending portion is formed on the portable electronic device, will be described in detail below. However, the present invention is not limited to this example, and at least one or more bend portions may be formed.

On the other hand, the flexible display unit 151 includes a first portion A, a second portion B, and a third portion C that that are distinguished by the bend portion 310. More specifically, the flexible display unit 151 includes the first portion A, the second portion B, which is formed connected to one end of the first portion A in such a manner as to rotate about the bend portion so that the second portion B can be in a state where the second portion B covers the first portion A or can be in a state where the second portion B does not cover the first portion A, and the third portion C that is formed connected to the opposite end of the first portion A and that, among the all portions of the display unit 151, is exposed to the outside, in a state where the second B covers the first portion A.

On the other hand, because visual information is included in the bend portion as well, the controller 180 includes the bend portion 310 in the first portion A and/or the second portion B without regarding the bend portion 310 as a separate portion.

At this point, in the state where the second portion B covers the first portion A, the first portion A and the second portion B are entirely brought into contact with each other without any portion being exposed to the outside. A portion that the first portion A and the second portion B make up is referred to as a "first segment."

On the other hand, the third portion C, which the second portion B does not cover, is exposed to the outside. The third portion C is referred to as the remaining portion other than the first portion A and the second portion B, the remaining portion that the second portion B does not cover, or a "second segment."

At least one of the position and size of each of the first to third portions varies according to a position in which the bend portion 310 is formed. That is, the first to third portions are distinguishable by the bend portion that is formed by pressing one segment of the body of the portable electronic device over another segment of the body of the portable electronic device. Accordingly, the user can bend the portable electronic device to a desired size in such a manner as to carry the portable electronic device with himself/herself, and, even in a state where the portable electronic device is bent, can check for an event that occurs in a terminal using the second segment that is exposed to the outside.

On the other hand, the body of the portable electronic device has at least one or more of basic states, and is configured in such as a manner that, in a case where an external force to bend the portable electronic device in a first arrow-indicated direction 300 is not applied, the portable electronic device returns to any one of at least one or more of the basic states. That is, the portable electronic device is configured in such a manner that, in the state where the external force to bend the portable electronic device is not applied, the portable electronic device maintains the basic static or returns to the base state from a state other than the basic state. For example, as illustrated in FIG. 3A, the basic state is a state where the display unit 151 has a single flat surface. More specifically, the basic state means a flat state in where the first to third portions A to C and the bend portion 310 make up one surface.

On the other hand, the portable electronic device 100 may include a fixing member (not illustrated) that is formed in such a manner as to maintain a state other than the basis state (or a state different from the basic state). For example, after switching to a closed state where the second portion B covers the first portion takes place by an external force, the external force is released. In this case, with the fixing member, the portable electronic device maintains the closed state without returning to the basic state.

Under the control of the controller 180, the fixing member keeps the portable electronic device bent. More specifically, the fixing member is formed in such a manner that the portable electronic device maintains the closed state. More specifically, the fixing member provided in the portable electronic device keeps the portable electronic device in a bent state in such a manner that one portion of the display unit 151 and the opposite portion are brought into contact with each other. That is, the second portion 310 rotates about the bend portion 310 and thus the state where the second portion 310 covers the first portion A is maintained.

Additionally, the fixing member cancels a fixed state where the portable electronic device is bent, in order for the portable electronic device to return to the basic state from the bent state. More specifically, in a state where the closed state is maintained, under the control of the controller 180, the fixing member cancels the fixed state where the portable electronic device is bent, in order for the closed state to be further maintained. Accordingly, the state where the second portion B covers the first portion A is switched to the state (or the basic state) where the second portion B does not cover the first portion A.

As one example, the fixing member may include an electromagnet that attracts an object that is a distance away. For example, multiple electromagnets are arranged in the first portion A and the second portions B, respectively, to attract each other, in such a manner that, in the state where the second portion B covers the first portion A, the closed state is maintained.

In a case where the fixing member is configured to include the electromagnet, the closed state is automatically canceled when a predetermined condition is satisfied, or is manually canceled by an external force greater than a magnetostatic force exerted by the fixing member. In a case where the closed state is canceled, the controller 180 performs control in such a manner that electric current is no longer supplied to the electromagnet and thus the first portion A and the second portion do not attract each other. In this case, the body of the portable electronic device returns to the basic state from the closed state.

Here, a predetermined condition is a condition such as a case where a user input for canceling the fixed state maintained by the fixing member is applied to an input unit on a back side.

As another example, the fixing member and the display unit 151 may be layered or be formed into one piece. Then, the control of the controller 180, the fixing member may be formed in such a manner that the fixing member changes between a flexible state and a non-flexible state. Accordingly, in a state where the fixing member is in the non-flexible state, the body of the portable electronic device electronic maintains the bent state. Otherwise, in a state where the fixing member is in the flexible state, the body of the portable electronic device is bent or changes in shape.

On the other hand, in the state where the second portion B covers the first portion A, that is, in the state where the first and second portions are brought into contact with each other, the first segment may change in shape by an external force. More specifically, of the first portion A and the second portion B that make up the first segment, the second portion B may change in shape by the external force.

For example, as illustrated in FIG. 3C, the first segment changes in shape by sliding motion D of the second portion B. More specifically, the sliding motion D of the second portion B makes the segment A small in size, and thus a border portion (or the bend portion between the first portion A and the second portion B) moves. Accordingly, an area of the first segment decreases (AB→AB'), and an area of the second segment increases (C→C').

Here, a direction of the sliding motion D illustrated in FIG. 3C is defined as a downward direction, and the direction opposite to the sliding motion D is defined as an upward direction. The sliding motion D is produced by a sliding gesture that pushes the second portion B downward, and a sliding motion in the direction opposite to the sliding motion D is produced by a reverse sliding gesture that pushes the second portion B upward. Although not illustrated in the drawings, when the sliding gesture in the reverse direction is applied, the area of the first segment increases, and the area of the second segment decreases. That is, according to the sliding gesture or the sliding gesture in the reverse direction, the first segment and the second segment change in position and size. Accordingly, by applying an external force, a segment for display, which is exposed to the outside, is arbitrarily changed, and the width of the portable electronic device is adjusted for ease of carrying the portable electronic device.

In another example, as illustrated in FIG. 3D, the motion of the second portion B produces a relative inclination of the second portion B with respect to the first portion A. The inclination causes the first segment to change in shape. More specifically, in a state where the first portion A and the second portion B are brought into contact with each other, one portion of the display unit 151 is switched from a covered state to a non-covered state.

Here, a gesture that moves the second portion B in such a manner that the second portion B is inclined with respect to the first portion A is referred to as a pushing gesture. As one example, as illustrated in FIG. 3D, when the pushing gesture is applied in a rightward direction R, the second portion is inclined relatively rightward with respect to the first portion A. Although not illustrated in the drawings, when the pushing gesture is applied in a leftward direction, the direction opposite to the rightward direction R, the second portion B is included relatively leftward with respect to the first portion B.

Because the sliding gesture causes the bend portion to change in position, the bend portion moves in a direction in which the sliding gesture is applied, and thus the first segment and the second segment change in area. On the other hand, the pushing gesture causes one portion of the display unit 151 to be switched from the covered state to the non-covered state. At this point, because the bend portion is fixed, the first portion and the second portion do not change in area.

On the other hand, with the pushing gesture, the bend portion may be somewhat moved, but when the bend portion is moved within a predetermined range, this is regarded as a fixed state of the bend portion. That is, a sensing unit 140 determines that the pushing gesture is applied, in a case where the bend portion moves within the predetermined range, and determines that the sliding gesture is applied, in a case where the bend portion moves out of the predetermined range.

With the fixing member, the first portion and the second portion are fixed in such a manner as to face each other. In this case, although the pushing gesture causes the inclination to occur, when the external force is released, an inclined state is canceled and returning to a previous state takes place. That is, in response to the release of an external force, the inclination due to the external force is canceled and the returning to an original state takes place.

A case where, as described above, the motion of the bend portion causes the first portion to change in area or causes the first portion A and the second portion B, which make up the first segment, to be inclined with respect to each other, is hereinafter defined as a case where a "shape change" occurs in the first segment.

The sensing unit 140 (refer to FIG. 1) in the portable electronic device according to the present invention detects the shape change in the covered portion of the display unit 151 in a state where at least one portion of the display unit 151 is covered. Then, based on the detected shape change, the controller 180 (refer to FIG. 1) controls information that is displayed on one portion (or the second segment) that is not covered and thus is exposed to the outside. At this point, the controller 180 performs control in such a manner that the first segment of which the first portion A and the second portion B are brought into contact with each other is in an inactivated state where illumination is not provided and the second segment is in an activated state where the illumination is provided.

Figure 4A:
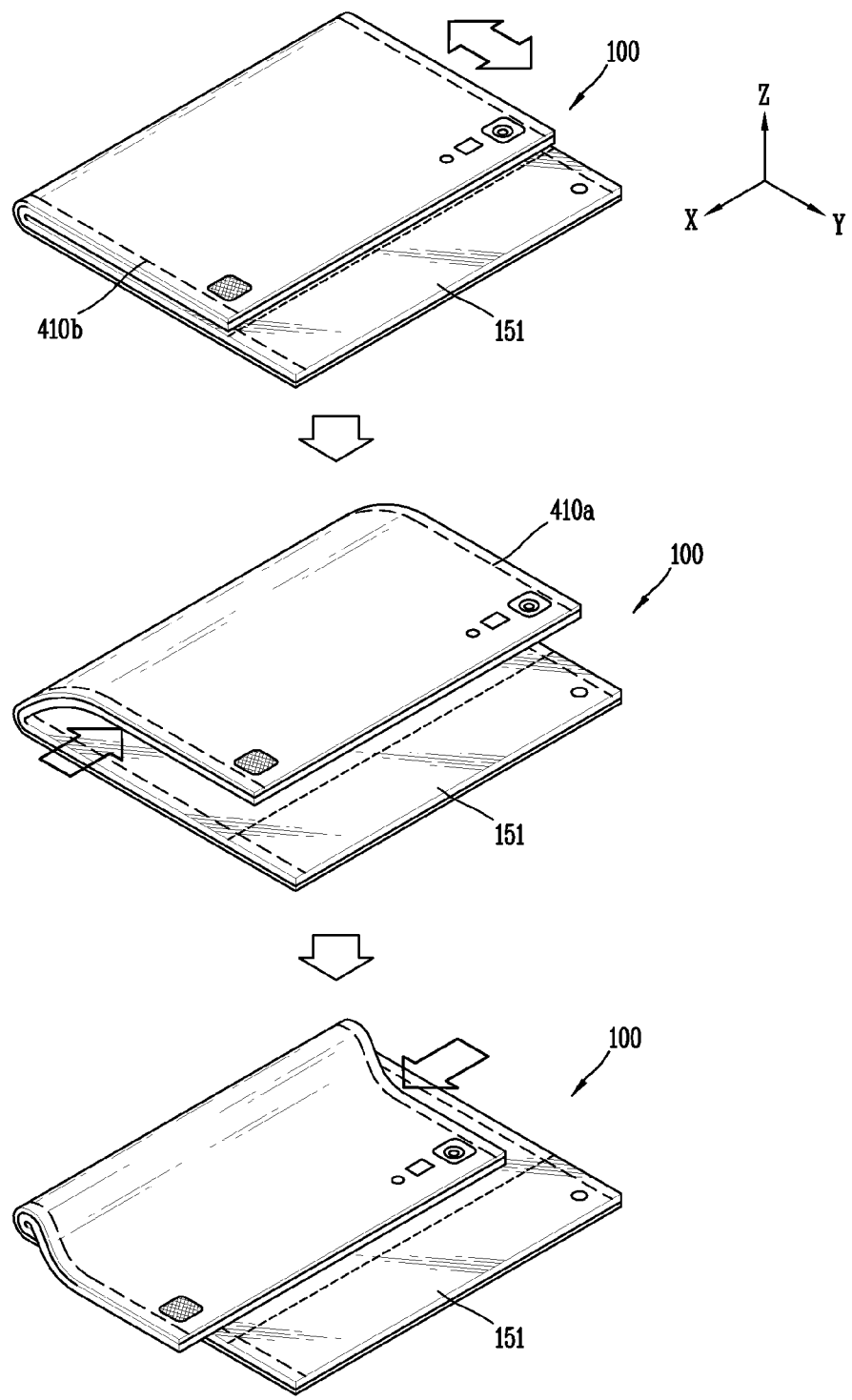

First, a method of detecting the shape change in the covered portion is described referring to FIG. 4A. Then, a method of controlling information that is displayed on the display unit 151 based on the shape change is described referring to FIG. 5.

Figure 4B:
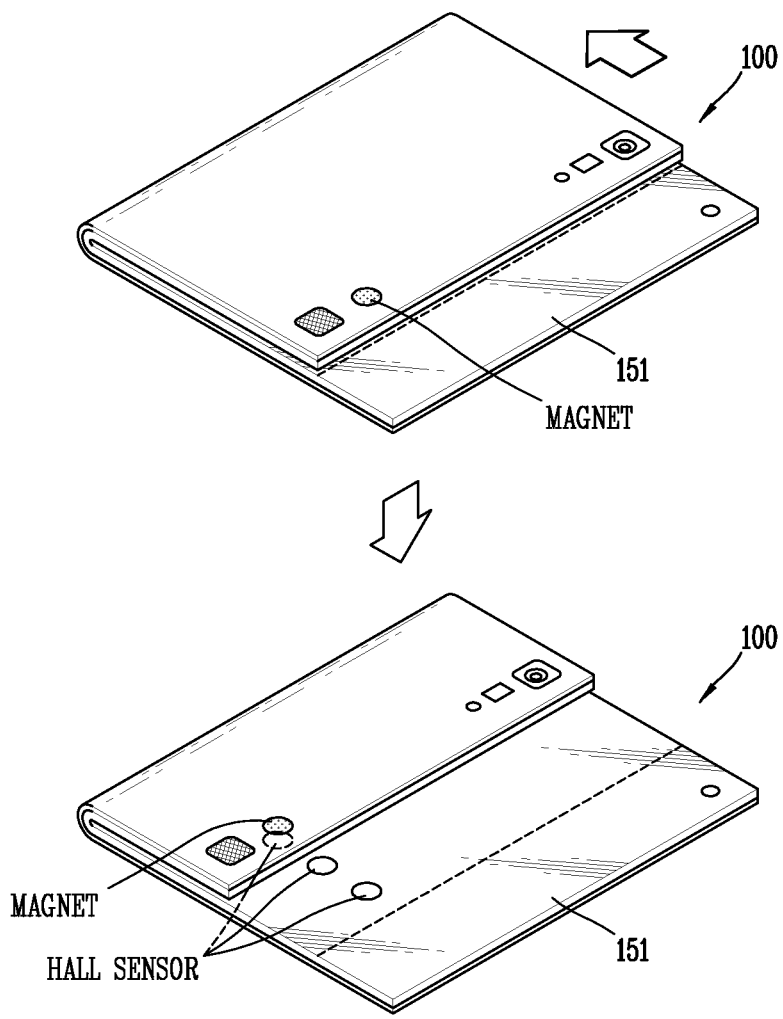

FIGS. 4A to 4C are diagrams for describing various methods of detecting the shape change in the portable electronic device according to the present invention.

The sensing unit 140 (refer to FIG. 1) in the portable electronic device according to the present invention based on control unit of wireless communication apparatus is formed in such a manner as to detect the shape change in one portion of the display unit 151.

As one example, as illustrated in FIG. 4A, a first sensing unit 410a and a second sensing unit 410b are arranged in a left end portion and a right end portion of the portable electronic device 100, respectively, in a lengthwise direction of the portable electronic device 100.

At this time, the first sensing unit 410a and the second sensing unit 410b are flex sensors, and sense the extent to which the portable electronic device is bent. Based on the sensed extent to which the portable electronic device is bent, the controller 180 searches for the bend portion and distinguishes between the first segment of which the first portion A and the second portion B are brought into contact with each other and the second segment exposed to the outside. Then, the controller 180 detects the sliding motion (in the Y-axis positive direction) or the reverse sliding motion (in the Y-axis negative direction) according to the change of the bend portion.

Additionally, the controller 180 calculates the extent to which the first segment is inclined, based on the detected extent to which the portable electronic device. That is, the extent to which the second portion is inclined relatively leftward and/or leftward with respect to the first portion is checked and a direction in which the second portion is included is checked as well. For example, the controller 180 determines that a state illustrated in FIG. 4A is a normal state where the second portion is not inclined, determines that a state illustrated in FIG. 4B is a state where the second portion is inclined in a leftward (X-axis negative direction), and determines that a state illustrated in FIG. 4C is a state where the second portion is inclined in a rightward (X-axis positive direction).

As another example, as illustrated in FIG. 4B, the sensing unit 140 includes multiple hall sensors and a magnetic member, and the controller 180 detects the shape change in the first segment using an electrical signal. For example, the first segment of which the first portion A and the second portion B are brought into contact with each other and the second segment exposed to the outside are detected, and the sliding motion (in the Y-axis positive direction or in the Y-axis negative direction) of the segment is detected more precisely than the flex sensor.

As another example, as illustrated in FIG. 4C, in a case where a touch panel is configured to be a capacitive type, the controller 180 detects the first segment of which the first portion A and the second portion B are brought into contact with each other, using a change in capacitance. Then, the shape change in the first segment is detected by tracking in real time the first portion A and the second portion B that are brought into contact with each other. For example, the controller 180 determines that the state illustrated in FIG. 4C is the normal state where the second portion is not inclined. In a case where the normal state is switched to the state, the controller 180 detects one part 430a of the first portion A and one part 430b of the second portion B, which are switched from the covered state to the non-covered state. The controller 180 determines the direction of the inclination and the extent of the inclination using the found one part 430a and the found one part 430b. It is determined that the state illustrated in FIG. 4B is a state where the second portion B is included in the X-axis direction (X-axis negative direction).

Figure 5:
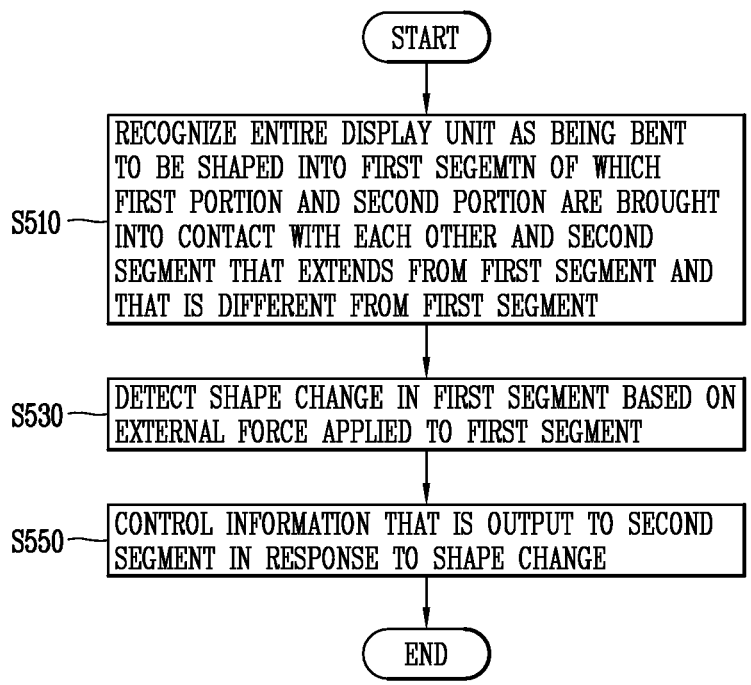
FIG. 5 is a flowchart for describing a method of controlling the portable electronic device according to one embodiment of the present invention.

On the other hand, as described above, the controller 180 controls information that is output to the second segment exposed to the outside, using the shape change in the first segment. FIG. 5 is a flowchart for describing a method of controlling the portable electronic device according to one embodiment of the present invention.

First, with the sensing unit 140 (refer to FIG. 1), the controller 180 (refer to FIG. 1) recognizes the entire display unit 151 (refer to FIG. 1) as being bent along an arbitrary bend portion to be shaped into the first segment of which the first portion A and the second portion B are brought into contact with each other and the second segment that extends from the first segment and that is different from the first segment (S510).

Here, the display unit 151 means a flexible display unit that is flexibly formed in such a manner that at least one portion can be bent. In a case where at least one portion of the flexible display unit is bent by applying a physical force to the flexible display unit, the sensing unit 140 detects that the flexible display unit is bent.

Here, the flexible display unit 151 is bent by applying an external physical force to the flexible display unit 151, and the external physical force is applied by the user or with an object.

The controller 180 controls the sensing unit 140 in such a manner that it is detected that the flexible display unit 151 is bent. Here, the controller 180 controls the sensing unit 140 in such a manner that, although the flexible display unit 151 is bent along any portion of the flexible display unit 151 regardless of a specific portion (on a specific position on) of the flexible display unit 151, it is detected that the flexible display unit 151 is bent. In addition, the controller 180 controls the sensing unit 140 in such a manner that it is detected which portion (or which position on) of the flexible display unit 151 the flexible display unit 151 is bent along, or which direction the flexible display unit 151 is bent in. Additionally, the controller 180 controls the sensing unit 140 in such a manner that the folded state, that is, the state where one portion of the sensing unit 140 is brought into contact with the opposite portion or is positioned in close proximity to the opposite portion, is detected.

Subsequently, with the sensing unit 140, the controller 180 detects that the display unit 151 is bent along at least one portion of the display unit 151. Then, the controller 180 detects at least one bend portion that serves as the bend axis. For example, the controller 180 detects the bend portion that is formed on the display unit 151, and distinguishes between the first segment and the segment that result from forming the bend portion.

In the bent state, the first segment and the second segment are different in terms of types of information that are displayed, and different graphic user interfaces (GUI's) result in the partition into the first segment and the second segment. For example, in the bent state, the control is performed in such a manner that the first segment is in the inactivated state where the illumination is not provided and the second segment is in the activated state where the illumination is provided to display a predetermined graphic user interface. Because a display region varies depending on the bent state, battery power can be efficiently used.

In addition, the first segment includes a first portion and a second portion. Here, the second portion is formed to be rotatable about one border portion that is formed connected to one end of the first portion so that the second portion covers the first portion or does not cover the first portion.

In the bent state, an execution screen that is produced by performing one or more functions is displayed on the second segment. The execution screen means various types of screen information that can be output on the display unit 151. Examples of the screen information include an execution screen of an application, a home screen, a menu screen, a screen that corresponds to an function executed at a user's request, and an alerting screen that alerts the user to an occurrence of an event, a locking screen that is formed for inputting a password to cancel a locked state, and the like. Then the screen information is configured from at least one among text, an image (including an icon), a flash, and a moving image.

At this time, when an event occurs in at least one application, the controller 180 outputs an alerting icon alerting the user to the event is output to the second segment. In a state where the second segment is in the inactivated state, in a case where an event occurs, the second segment is switched from the inactivated state to the activated state, thereby displaying the alerting icon. Otherwise, in a state where the second segment is in the activated state, in a case where an event occurs, a graphic user interface (GUI) for an application that is being executed is output and, in this state, the event occurs.

The application includes a widget, or a home launcher, and the like in terms of conception, and means all types of programs that can be executed on the terminal. Therefore, the applications include a web browser, and programs that perform a function of music reproduction, a function of moving image reproduction, a function of message transmission and reception, a function of schedule management, and a function of application update.

For example, occurrences of events include an occurrence of a missed call, the presence of an update-target application, a message arrival, charging, power-on and power-off of the terminal, pushing-down of an LCD awake key, alarming, an incoming-call arrival, the presence of missed notification, reproduction of a piece of new music and the like.

As another example, when specific information is received through a wireless communication unit of the terminal, an event is regarded as occurring in an application associated with the specific information, and the controller 180 detects this. Additionally, in a case where today is a date for an item on the day's agenda, an event is regarded as occurring today in a schedule management application.

The display unit 151 may include a touch sensor that detects a touch input in such a manner that the touch input is applied to the alerting icon. The display unit 151 outputs visual information that is realized in the form of an image such as a GUI, text, or an icon, but, when a predetermined time elapses or by inputting a specific control command, the visual information being output is switched to an inactivated state.

In the bent state, the alerting icon is displayed on the second segment in such a manner that the first segment and the second segment are distinguishable. The alerting icon may be in the form of a square image, and may be in the form of an image that varies according to a type of application in which an event occurs. As another example, the alerting icon may be in the form of an image that varies according to a type of event, or may be in the form of an image that varies according to an amount of information relating to an event. Here, the varying image means an image that varies in shape, length, color, and the like.

Next, with the sensing unit 140, the controller 180 detects the shape change in the first segment (S530). More specifically, with the sensing unit 140, the controller 180 detects the shape change in at least one of the first segment and the second segment that make up the first segment. For example, the controller 180 detects that the first segment changes in area and the first portion and the second portion are inclined with respect to each other.

Next, the controller 180 performs a function corresponding to the shape change, and controls information displayed on the second segment (S550). In this case, control is performed that varies according to a type of the shape change. That is, the controller 180 recognizes the shape change as one type of user input.

As one example, in response to the shape change, the controller 180 outputs information relating to the event to the second segment. For example, the event may be receiving of a message, and the information may be contents of the message. As another example the event may be alerting of a schedule that is set in the schedule management, and the information may be detailed information on the schedule being set. As another example, the event may be an occurrence of an update-target application, and the information may be detailed information on the update-target application or the like.

In a case where the shape change due to a sliding input is detected, the sliding input causes the first segment to decrease in area, and causes the second segment to increase in area. With this change, an amount of information to be displayed on the second differs according to an area of the second segment.

In a case where first event information corresponding to a first event and second event information corresponding to a first event are present, when, with the sliding input, an area of the second segment reaches a first reference area, the second event information that occurred relatively recently is first displayed. Subsequently, when the sliding input continues to be applied and thus the area of the second segment reaches a second reference area greater than the first reference area, the first event information is displayed on a portion that results from the extension. That is, when the area of the second segment reaches the first reference area, only the second event information is displayed, but when the area of the second segment reaches the second reference area, the second event information and the first event information are displayed together. As the area of the second segment increases, different pieces of event information are sequentially added for display in the order from an event that occurred most recently to an event that occurred earliest.

As another example, in a case where the shape change due to the pushing input is detected, the controller 180 performs a control function that varies according to a direction of the inclination. For example, information to be output changes according to the direction in which the second portion is inclined with respect to the first portion. Here, the pieces of information to be output are pieces of information that correspond to the events that sequentially occur, respectively. More specifically, in a case where the second portion is inclined rightward in the first segment, a "next information view" function is performed, and in a case where the second portion is inclined leftward, a "previous information view" function is performed. Additionally, in a state where an execution screen associated with reproduction of a piece of music is displayed on the second segment, in a case where the second portion is inclined rightward, a function of reproducing a "next piece of music" is performed, and in a case where the second portion is inclined leftward, a function of reproducing a "previous piece of music" is performed.

Accordingly, the portable electronic device according to the present invention provides an intuitive user interface that controls the information to be displayed on the second segment using the shape change in the first segment of which the first portion and the second portion are brought into contact with each other.

Various control methods according to embodiments of the present invention are described below referring to the accompanying drawings. Constituent elements according to the embodiments of the present invention, which are the same as or similar to those described above, are given the same reference numerals, and descriptions of them are omitted.

FIGS. 6A to 9B are diagrams illustrating methods in which information to be displayed on the second segment is controlled using the shape change in the first segment of which the first portion and the second portion are brought into contact with each other, as examples of an operation that is performed by the portable electronic device in FIG. 1.

Figure 6A:
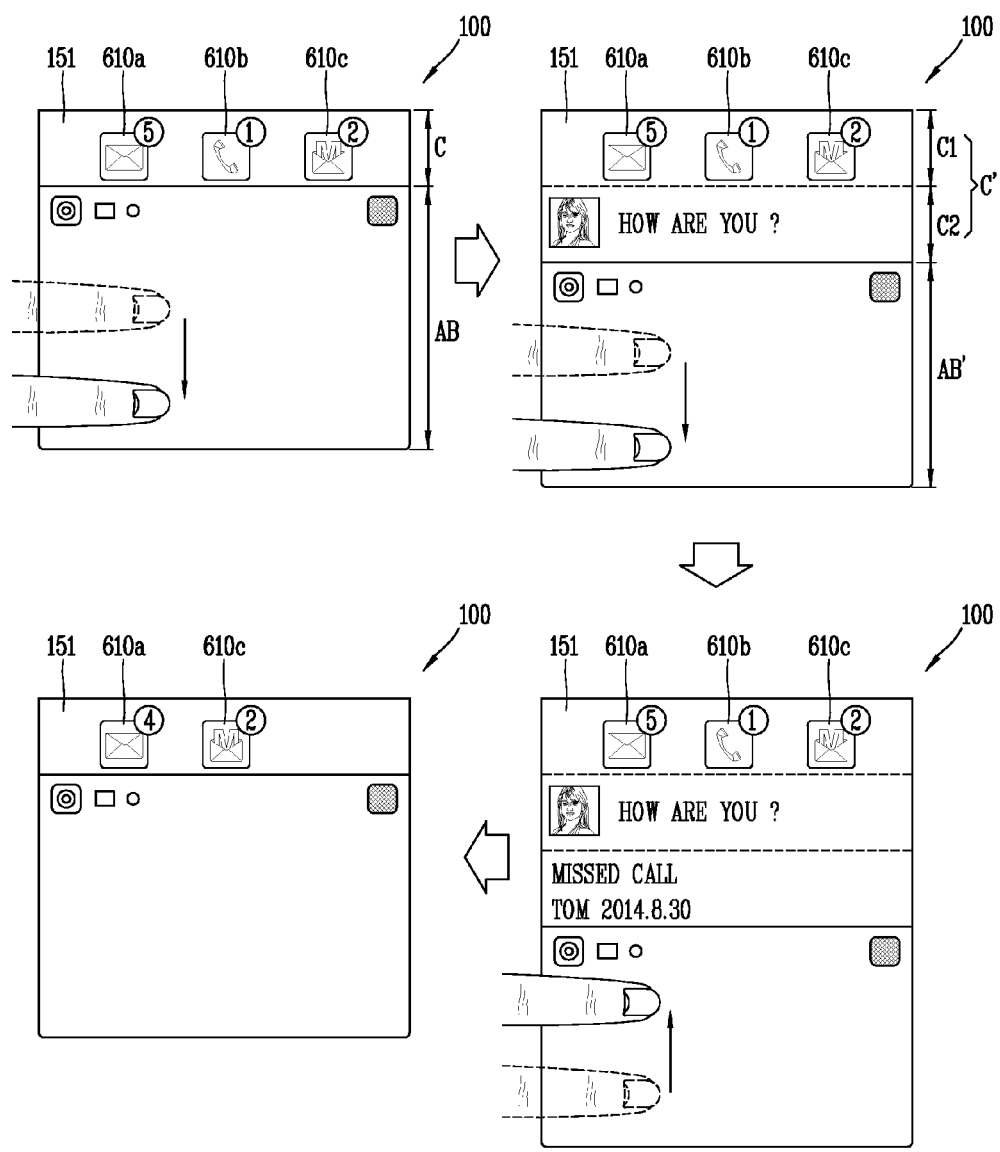
FIGS. 6A to 9B are diagrams illustrating methods in which information to be displayed on a second segment is controlled using a shape change in a first segment of which a first portion and a second portion are brought into contact with each other, as examples of an operation that is performed by the portable electronic device in FIG. 1.

As one example of this control, referring to FIG. 6A, the display unit 151 is divided into a first segment AB in which, in the bent state, a first portion and a second portion are brought into contact with each other, and a second segment C. In the bent state, alerting icons are generated in order in which events occur, and are output to the second segment C. When the user finishes checking the alerting icons, the alerting icons disappear. Then, the alerting icons are arranged according to types of applications in which events occurs.

More specifically, referring to FIG. 6A, alerting icons that alert the user to occurrences of events are output to the second segment C in order in which the events occurs in an application. As an example of this, the present drawings illustrates an example in which first to third alerting icons 610*a*, 610*b*, and 610*c* are arranged along the width direction of the portable electronic device.

In this case, the alerting icons are icons each of which represents a category. For example, a first alerting icon 610*a* is an icon representing a category associated with message reception, a second alerting icon 610*b* is an icon representing a category associated with a missed call, and a third alerting icon 610*c* is an icon representing a category associated with mail reception. This arrangement of the alerting icons according to the category enables the user to view only alerting items associated with a necessary application in a convenient manner.

Additionally, the controller 180 accumulates events and the number of times that the event occurs. Each of the alerting icons includes guidance information indicating the number of times that the event occurs. As an example of this, the present drawings illustrate the guidance information indicating that the number of received messages is 5, the number of missed calls is 1, and the number of unread mails is 2. That is, in the example, the number of different events that occur is 8.

First, in a state where the second and third alerting icons 610b and 610c are output to the second segment C, when a message arrives, the first alerting icon 610a that alerts the user to the arrival of the message is output to the second segment C. In this case, the second and third alerting icons 610b and 610c move rightward along with the width direction of the portable electronic device. That is, the alerting icon that is arranged at the right end indicates the event that occurred recently.

In the present example, in a state where one portion of the portable electronic device is bent, the alerting information is visually output to a portion exposed to the outside.

However, the present invention is not limited to this. In another example, the first to third alerting icons 610a, 610b, and 610c are output to their respective designated positions in order in which they occur.

When the user, as illustrated in FIG. 6A, applies the sliding gesture to the first segment AB, the second segment C, changes in area (or position and size). That is, with the sliding gesture, the first segment decreases in area (AB→AB'), and the second segment increases in area (C→C').

With the sensing unit 140, the controller 180 detects a change in the area of the second segment, and displays information relating to an event on the portion that results from the extension. More specifically, in response to the shape change in the second segment, the controller 180 partitions a second segment C' into a first sub-portion C1 and a second sub-portion C2, continues to displays an alerting icon on the first sub-portion C1, and displays information relating to an event on the second sub-portion C2.

On the other hand, with the sliding gesture, as the second segment C changes in area, an amount of information included in the second segment C changes. More specifically, the controller 180 determines an amount of information (or the number of events to be displayed) to be displayed on the second segment, based on the area of the second segment. When the area of the second segment is smaller than a first area, one event that occurred most recently among events that occurred is displayed on the second segment. Subsequently, when the area of the second segment is smaller than a second area that has a greater value than the first area, pieces of information relating to two events that occurred most recently among the events that occurred are displayed on the second segment. That is, as the second segment increases in area, the number of events included in the second region increases. As the second segment decreases in area, the number of events included in the second region decreases.

In the present example, the user can not only adjust a size of the segment for display, which is exposed to the outside, while maintaining the bent state of the display unit 151, but he can also view new information relating to an event that occurs on the portable electronic device.

On the other hand, in a case where, with a reverse-direction sliding gesture, the area of the second segment becomes smaller than a predetermined area, the second alerting icon 610b associated with the event displayed on the second segment, disappears. That is, the controller 180 not only terminates the displaying of the information relating to the event, but also terminates the displaying of the alerting information.

Although not illustrated in the drawings, in response to the reverse-direction sliding gesture, the controller 180 may switch the second segment from the activated state to the inactivated state.

In addition, positions of the remaining icons 610a and 610c are determined according to a movement of an icon associated with a recent event to the left end. That is, the first alerting icon 610a is arranged at the left end, and the third alerting icon 610c is arranged next to the first alerting icon 610a.

Figure 6B:
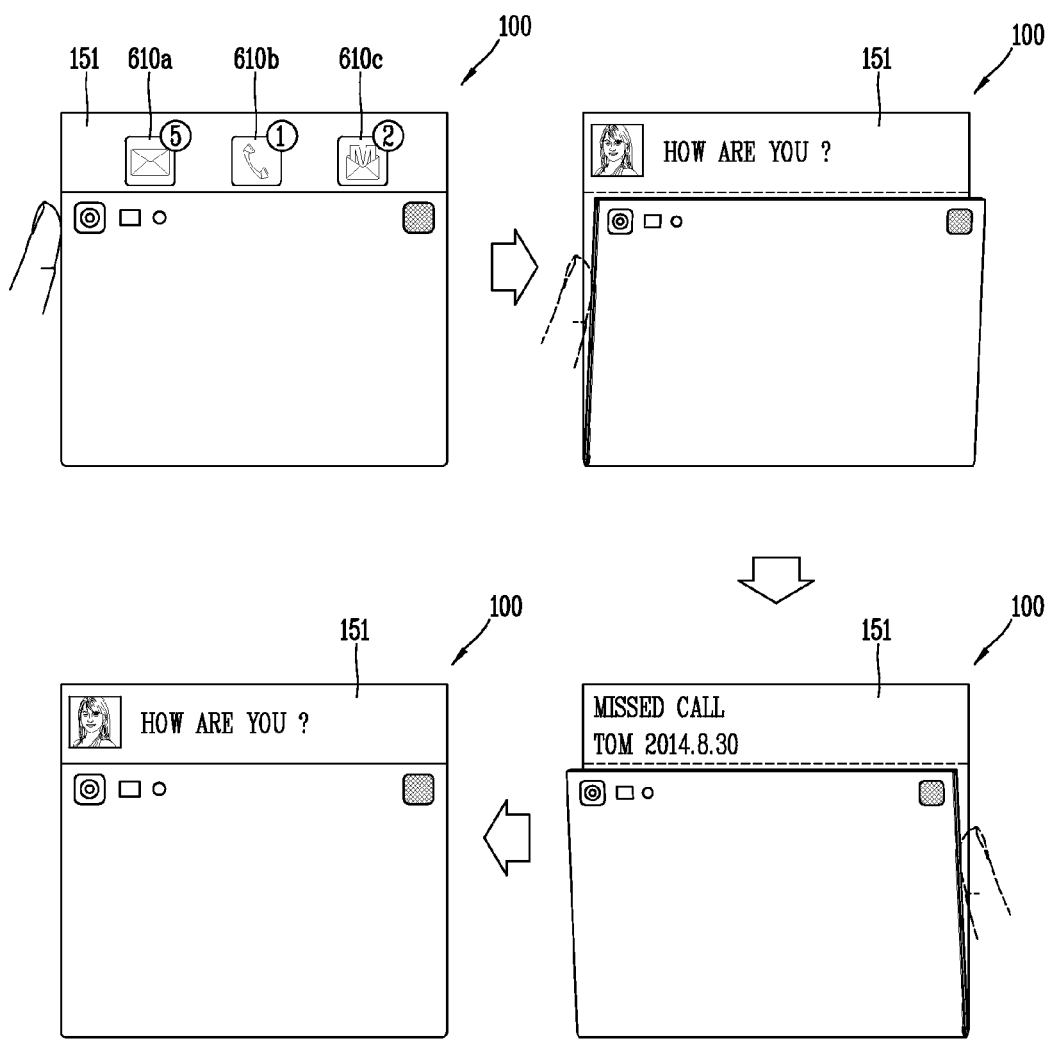

As another example, referring to FIG. 6B, with the sensing unit 140, the controller 180 detects an inclination of the second portion and a direction of the inclination, and, based on the direction of the inclination, displays information on any one of multiple events on the second segment.

More specifically, in a state where an alerting icon is displayed, when it is determined that the second portion is inclined rightward, information on one of the multiple events, which occurred most recently, is displayed on the second segment. Otherwise, in a state where the alerting icon is displayed, when it is determined that the second portion is included leftward, information on one of the multiple events, which occurred earliest, is displayed on the second segment. That is, information that precedes or follows the information that is displayed on the second segment is displayed according to the direction of the inclination.

Accordingly, although the user does not apply a touch, he/she can check various pieces of information by applying the pushing gesture to the first segment with his/her hand gripping the portable electronic device.

On the other hand, in a state where multiple alerting icons are displayed on the second segment, the user can select at least one alerting icon that he/she wants to check.

Figure 7A:
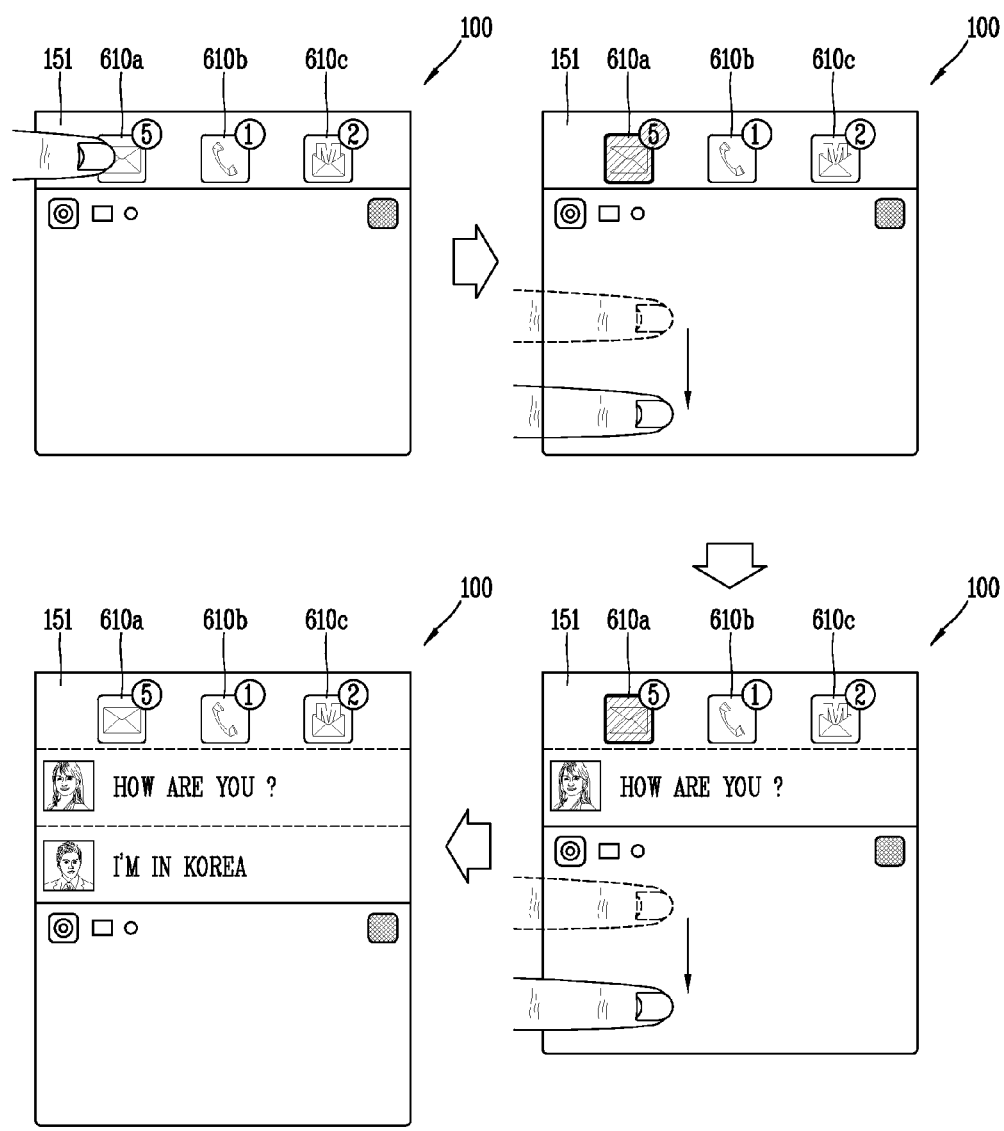

Referring to FIG. 7A, at least one is selected from among the alerting icons 610a, 610b, and 610c by applying a touch. When at least one alerting icon is selected by applying the touch, the selected alerting icon is highlighted to be distinguishable from the others. That is, when the first alerting icon 610a is selected by applying the touch, the first alerting icon 610a is processed differently visually than the second and third alerting icons 610a and 610c and thus is displayed on the second segment.

In a state where at least one alerting icon is selected, with the sliding gesture, the first segment decreases in area, and the second segment increases in area. At this time, the controller 180 searches for an application corresponding to the selected alerting icon, and extracts events that occur in the found application. Then, at least one or more events among the extracted events are arranged in the order from an event that occurred most recently to an event that occurred earliest, considering the area of the second segment. For example, according to the selection of the first alerting icon 610a, with the sliding gesture, at least one or more among events that occur in a message application, that is, among received messages, are sequentially arranged on the second segment.

Accordingly, the user can check the message that arrived previously without having to execute the message application. In addition, although a check box "read" is not checked in the message application, the user can check contents of the message the message application.

Although not illustrated in the drawings, when flicking is applied to a portion on which information relating to an event is displayed, scrolling is performed and thus information displayed on the second segment is updated. More specifically, information that is displayed before applying the flicking disappears, and new information that has not been displayed on the second segment is displayed.

Figure 7B:
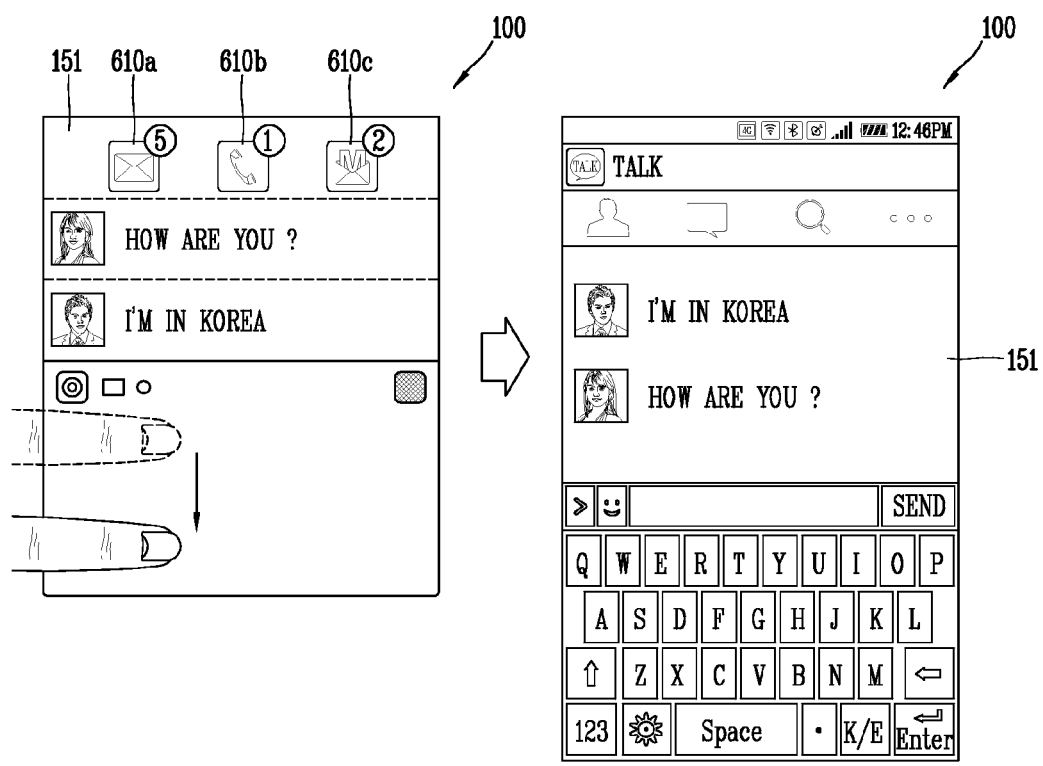
Figure 8:
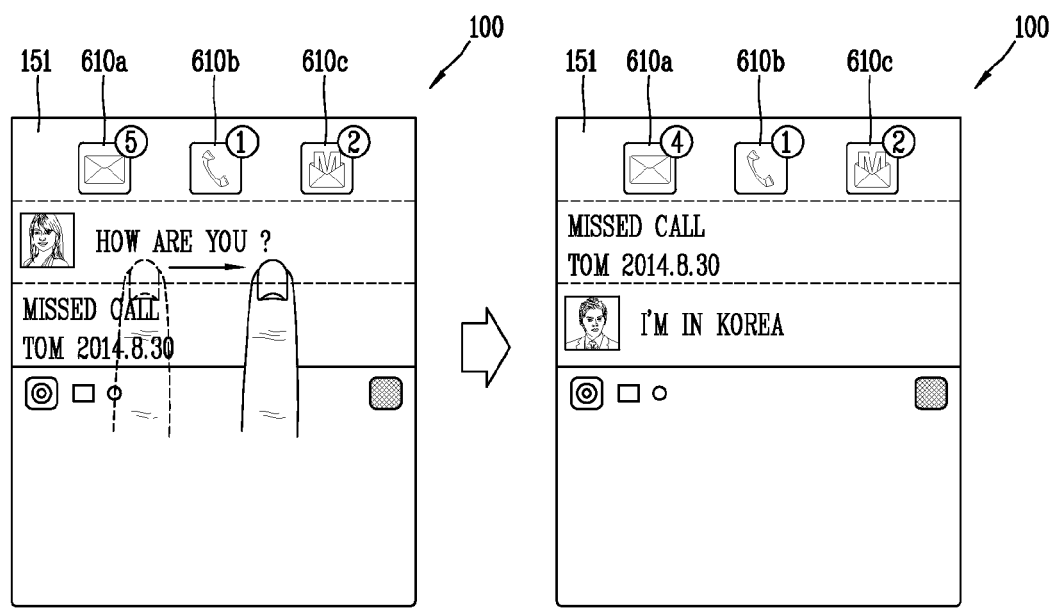

On the other hand, as illustrated in FIG. 7B, in a case where, with the sliding gesture, the area of the second segment becomes greater than a predetermined area, a specific application is executed, and an execution screen associated with the specific application is displayed on the second segment. That is, as the area of the second segment becomes greater, an amount of information displayed on the second segment becomes greater. Then, the amount of information reaches a predetermined level, a specific application is automatically executed. Here, the specific application corresponds to an application that is selected by applying a touch.

Although not illustrated in the drawings, when, with the sliding gesture, the area of the second segment becomes greater than a predetermined area, if pieces of information associated with an event are all included in the second segment, the controller 180 displays a home screen on the second segment. This is because the user checks all the events that occur in the portable electronic device.

In addition, as illustrated in FIGS. 8A and 8B, the flicking in the horizontal direction is possible. When the user applies the flicking to a specific event in the horizontal direction, information relating to the specific event disappears from the second segment. This is because an amount of information displayed in association with the specific event is limited. Now, a different piece of information that has not been displayed on the second segment is displayed on the second segment.

On the other hand, control is performed that varies according to the direction of the flicking. For example, in a state where the received message is displayed on the second segment, when the flicking in the rightward direction is detected, the controller 180 performs control in such a manner that a check box "read" is checked in the message application. The displaying of a message with the checked check box "read" on the second segment is limited, and by executing a message application, the user can check the message on an execution screen of the message application.

In another example, when the flicking in the leftward direction is detected, the controller 180 performs control in such a manner that the check box "read" is not checked in the message application, and deletes the received message. When the received message is deleted, although the execution screen of the message application is displayed thereafter, the deleted received message is no longer displayed.

Accordingly, the user can variously control an event that occurs in the message application, by applying the flicking to the second segment in the horizontal direction without having to running the message application.

Figure 9A:
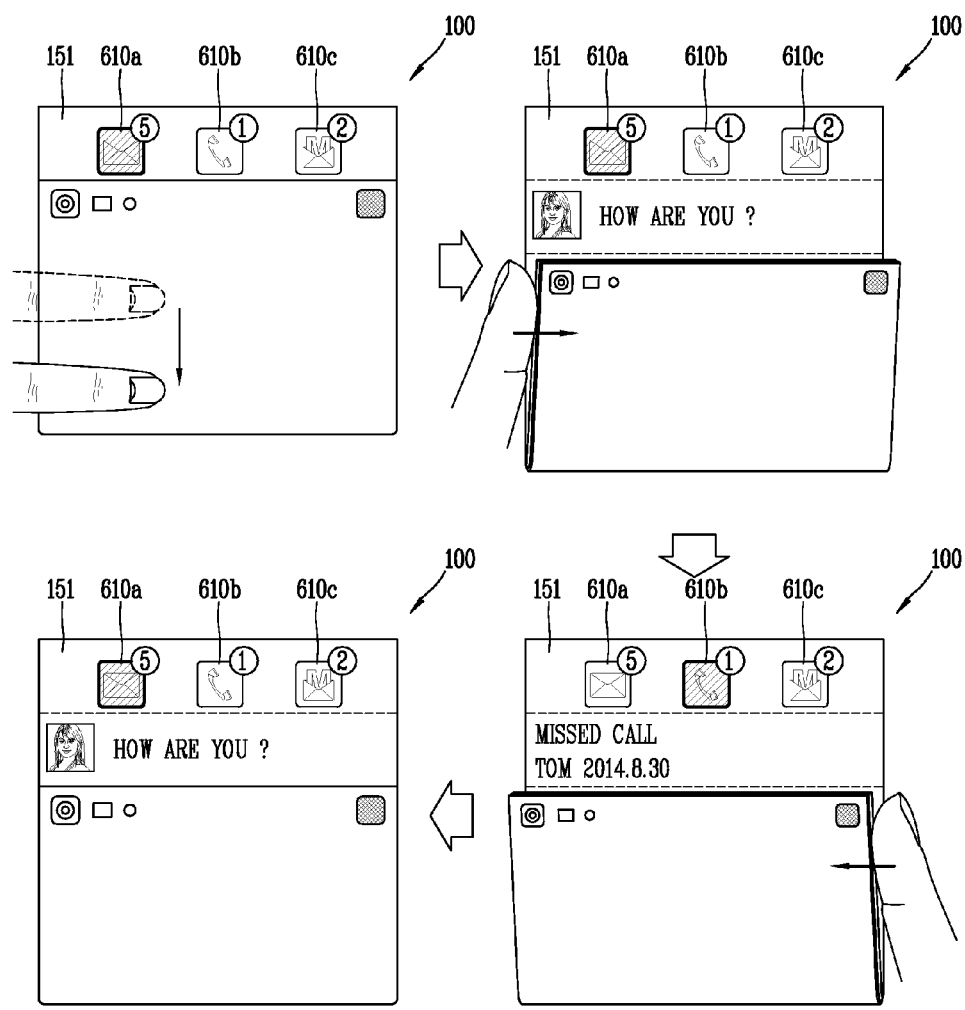

On the other hand, in the bent state, the first segment AB and the second segment C are in the inactivated state where the illumination is not provided. In a state where the entire display unit 151 is inactivated, when the sliding gesture is applied, the controller 180, as illustrated in FIG. 9A, switches the second segment from the inactivated state to the activated state where the illumination is provided. In the second segment that is switched to the activated state, an alerting icon is displayed that alerts the user to an occurrence of an event that occurs in at least one application while the entire display unit 151 is maintained as being in the inactivated state. At this time, the first segment maintains the inactivated state.

In a case where the sliding gesture continues to be applied and thus the area of the second segment becomes greater than a predetermined area, the controller 180 partitions the second segment into a first sub-portion C1 and a second sub-portion C2 and displays different pieces of information on the first sub-portion C1 and the second sub-portion C2, respectively. More specifically, an alerting icon continues to be displayed on the first sub-portion C1, and event information relating to an event is displayed on the second sub-portion C2.

On the other hand, in a state where the alerting icon and the event information are displayed at the same time, the pushing input may be applied to the first segment. In the case, the controller 180 displays the next-event information or the previous-event information to the second sub-portion C, based on the direction of the inclination due to the pushing input.

On the other hand, the sensing unit 140 in the portable electronic device according to the present invention detects a posture of the main body through various sensors provided in the portable electronic device. The sensors detecting the posture of the main body include a G-sensor, a terrestrial magnetism sensor, an inertial sensor, a gyro sensor, and the like.

The postures of the main body that are detected by the sensing unit include various postures that the main body of the portable electronic device can take on in association with a rotational angle of the main body, a rotational direction of the main body, a rotational speed of the main body, rotational acceleration of the main body, and the like.

Figure 9B:
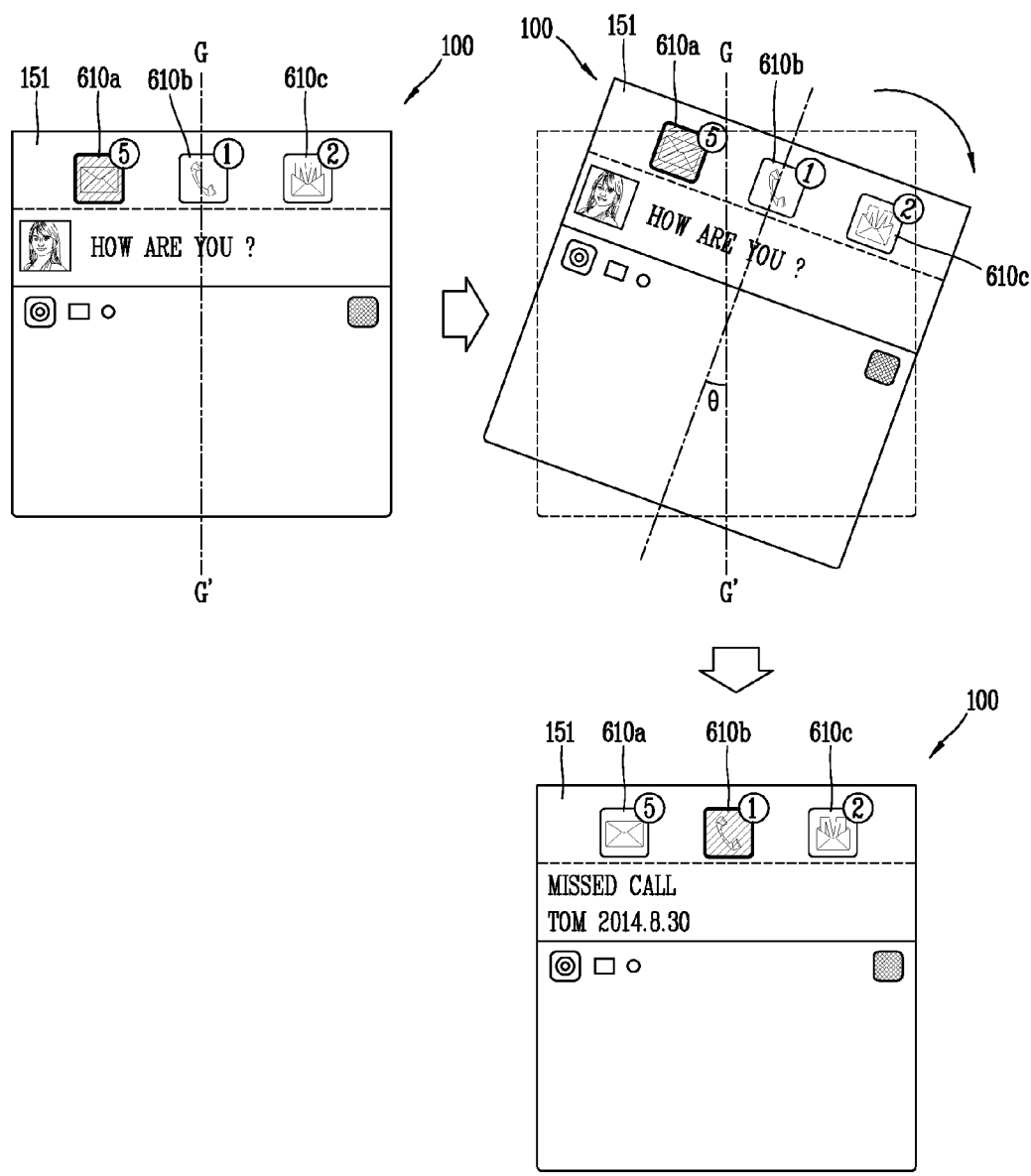

For example, as illustrated in FIG. 9B, the posture of the main body is determined depending on what angle the main body rotates at with respect to an imaginary reference line G-G' that is in accordance with a gravitational direction. At this time, the posture of the main body is defined in terms of an angle $\theta$ at which the main body rotates.

More specifically, the posture of the main body is a relative posture that is defined in terms of an angle that a first direction (for example, a longitudinal direction of the main body) makes with respect to the imaginary reference line G-G'. Here, the relative posture that is defined in terms of the first direction of the main body and the imaginary reference line G-G' varies according to an angle that the main body makes with respect to the imaginary reference line G-G'.

With the sensing unit 140, the controller 180 detects a tiling gesture in which the main body is tilted with respect to the first direction to an angle greater than a predetermined angle and then returns to its previous posture in the first direction. At this time, the controller 180 distinguishes a direction in which the main body is tilted with respect to the imaginary reference line G-G' in accordance with the gravitational direction. More specifically, the controller 180 distinguishes a state where a front side of the main body is tilted rightward with respect to the imaginary reference line G-G' and a state where the front side of the main body is tilted leftward with respect to the imaginary reference line.

The controller 180 variously controls information that is displayed on the second segment according to the direction in which the main body is tilted with the tilting gesture. For example, as illustrated in FIG. 9B, in a state where information on an event that occurred most recently is displayed on the second segment, when the tiling gesture is applied rightward, a function of viewing next information is performed. Although not illustrated in the drawings, when the tilting gesture is applied leftward, a function of viewing previous information is performed. That is, a function that is performed with the tilting gesture may be set to be the same as the function that is performed with the pushing gesture.

On the other hand, the pushing gesture and the tilting gesture may perform any one of the multiple alerting icons instead of performing the function of viewing the next information or the function of viewing the previous information.

More specifically, in a case where the second segment is switched from the inactivated state to the activated state, an alerting icon associated with an event that occurred most recently is automatically selected. For example, in a state where the first to third alerting icons 610a to 610c are displayed on the second segment, the first alerting icon 610a indicating the event that occurred most recently is automatically selected. With this selection, the first alerting icon 610a is highlighted in such a manner that the first alerting icon 610a is distinguishable from the other icons.

At the same time that any one of the alerting icons is automatically selected, event information on an application associated with the alerting icon is displayed. For example, according to the selection of the first alerting icon, event information on at least one of the events that occur in the message application is displayed on the second segment.

Subsequently, when the pushing gesture in the rightward direction or the tilting gesture in the rightward direction is applied, the second alerting icon 610b positioned to the right of the first alerting icon 610a is selected. Then, event information relating to the second alerting icon 610b is displayed on the second segment.

Otherwise, in a state where the first alerting icon 610a is selected, when the pushing gesture in the leftward direction and the tilting gesture in the leftward direction is applied, the third alerting icon 610c is selected. Then, event information relating to the third alerting icon 610c is displayed on the second segment.

Accordingly, the portable electronic device according to the present invention provides an intuitive user interface that controls information that is displayed on the second segment, using various gestures.

In addition, a side display according to the present invention may be used although specific information is received through the wireless communication unit. This will be described in detail below. FIGS. 10A to 10D are diagrams illustrating embodiments associated with information reception.

FIGS. 10A to 10D are diagrams illustrating operation of the side display in a case where a call signal is received.

As illustrated, when the call signal is received, information relating to the call signal is displayed on the second segment C. More specifically, when the call signal is received, an indicator indicating that the call signal is received is displayed on the second segment C. For example, an indicator is information on a calling party's terminal that transmits the call signal, for example, such as the telephone number of the calling party's terminal, or the name of the calling party.

Additionally, the indicator includes guidance information indicating a function that is performed by the pushing gesture or the tilting gesture. More specifically, information on a first function corresponding to a gesture in the rightward direction and information on a second function corresponding to a gesture in the leftward direction are displayed in a state of being included in the indicator. At this time, the first function is a reception acceptance function, and the second function is a reception refusal function.

Figure 10A:
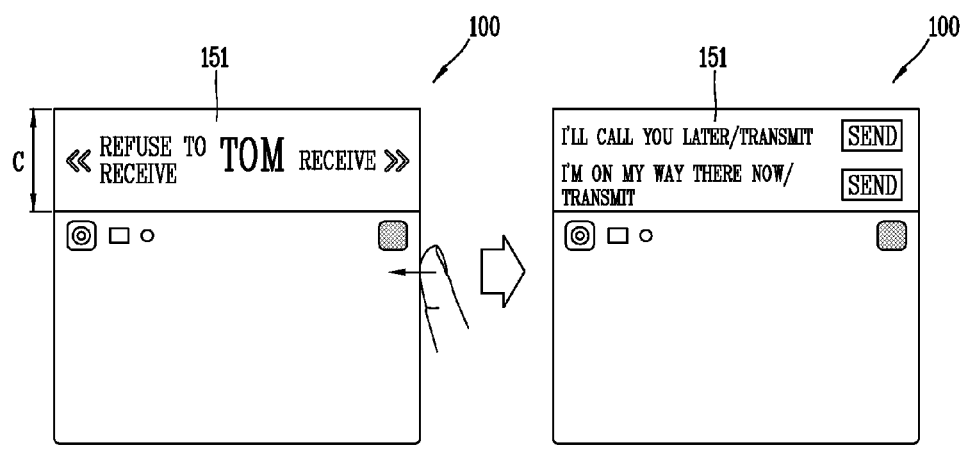

In a case where the pushing gesture in the leftward direction is detected as illustrated in FIG. 10A, or in a case where the tilting gesture in the leftward direction is detected as illustrated in FIG. 10C, a call that is being received is refused and refusal messages to be transmitted to the calling party are displayed on the second segment. When any one of the reception refusal messages is selected within a predetermined time, a selected message is transmitted to the calling party, and when any one is not transmitted within the predetermined time, the second segment is switched from the activated state to the inactivated state.

Figure 10B:
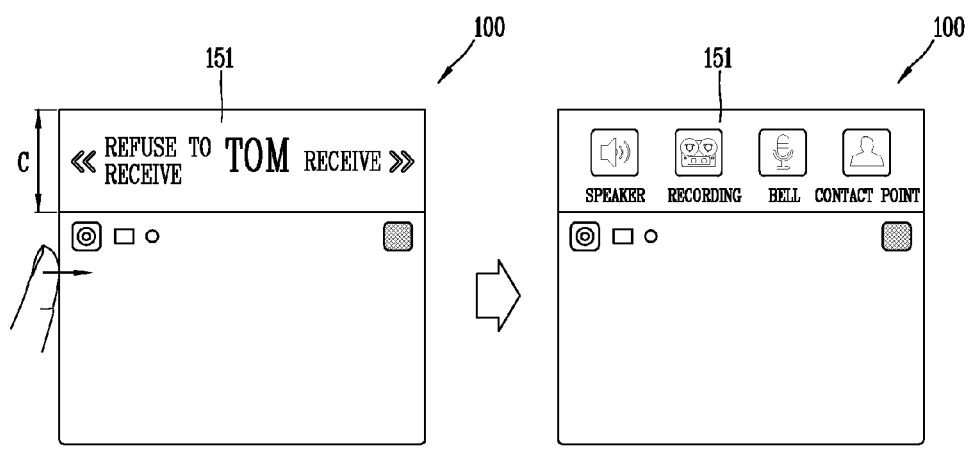

Otherwise, in a case where the pushing gesture in the rightward direction is detected as illustrated in FIG. 10B, or in a case where the tiling gesture in the rightward direction is detected as illustrated in FIG. 10D, the call that is being received is accepted and a telephonic conversation mode is entered. At this time, graphic objects associated with the telephone conversation mode are displayed on the second segment.

Figure 11A:
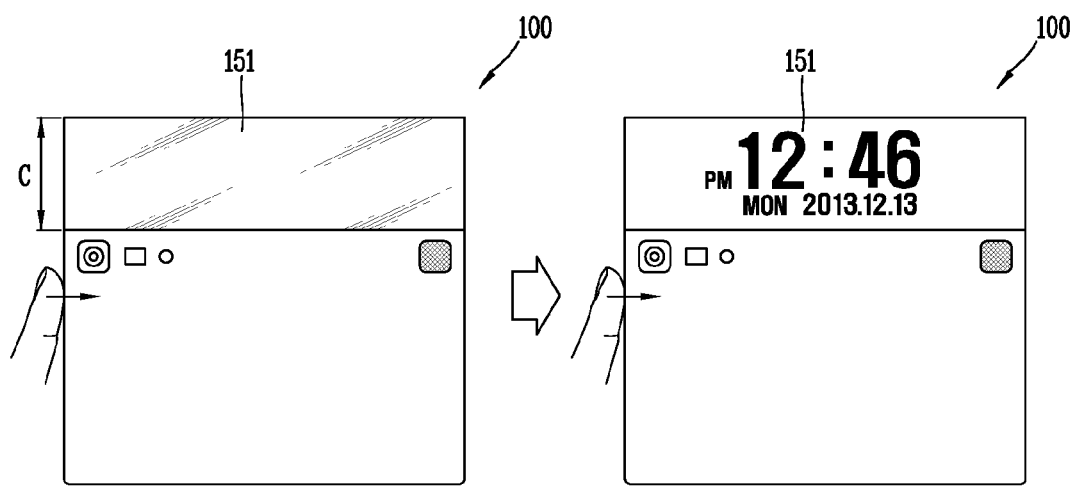
FIGS. 11A to 11C are diagrams for describing a method of controlling the information that is displayed on the second segment using a pushing gesture or a tilting gesture.
Figure 11A:
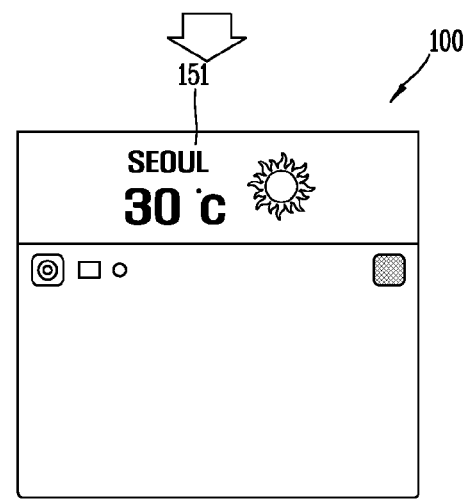
Figure 11B:
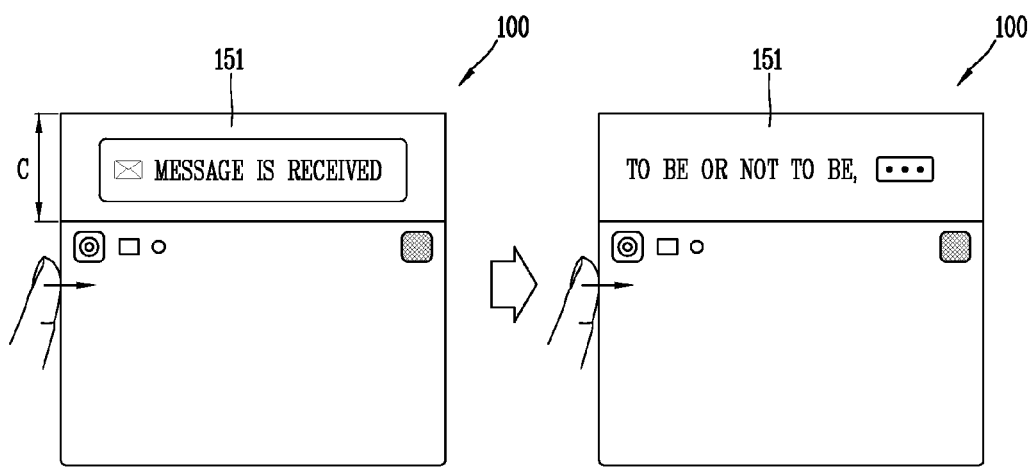
Figure 11B:
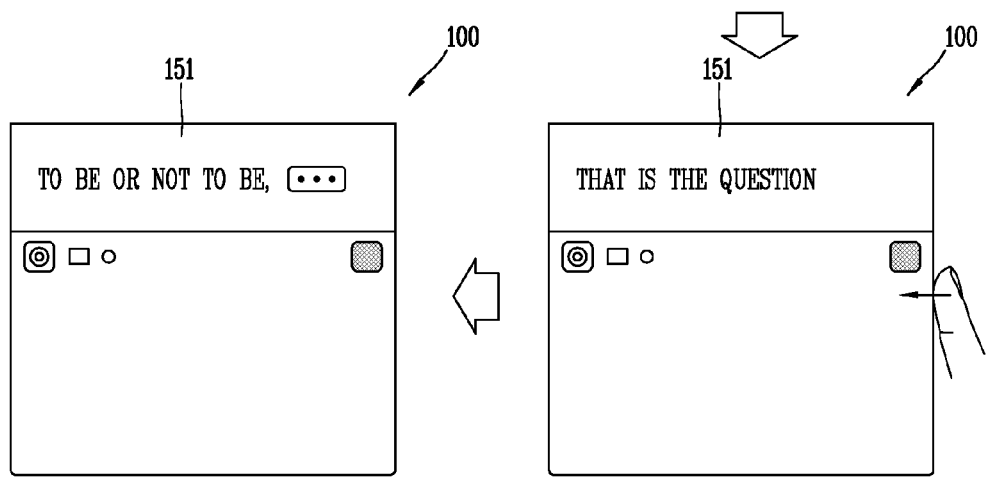
Figure 11C:
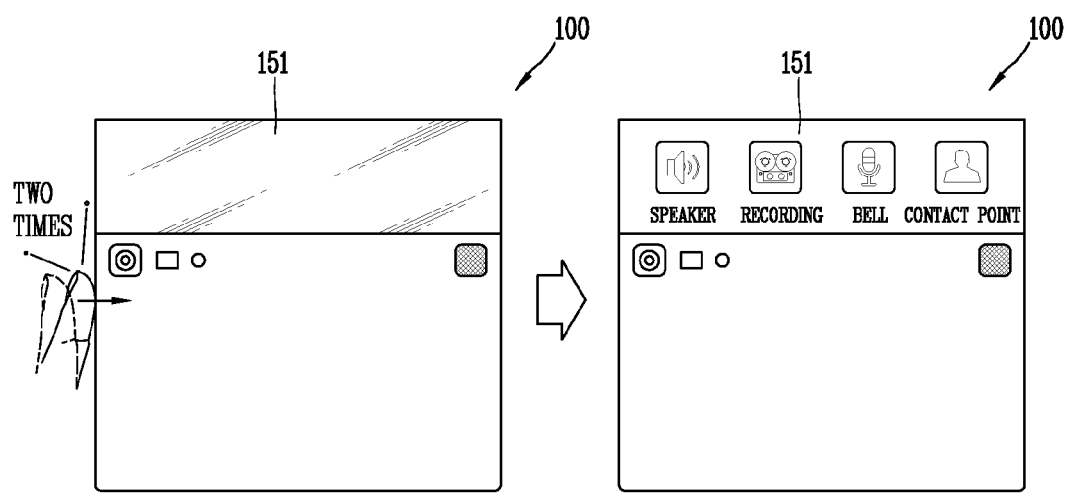

On the other hand, in the portable electronic device according to the present invention, the information that is displayed on the second segment is controlled using the pushing gesture or the tilting gesture regardless of an occurrence of an event. FIGS. 11A to 11C are diagrams for describing a method of controlling the information that is displayed on the second segment using the pushing gesture or the tilting gesture. However, the control method is described using the pushing gesture for convenience in description, but the tilting gesture can be instead used.

Referring to FIG. 11A, in a state where the entire display unit 151 is inactivated, the pushing gesture that generates the inclination in a specific direction is applied. In response to the pushing gesturing, the controller 180 switches the second segment from the inactivated state to the activated state, and displays predetermined screen information to the second segment according to a feature of the pushing gesture.

Here, the predetermined pieces of screen information mean various types of screen information that can be output on the display unit 151, and include an execution screen of an application, a home screen, a menu screen, a screen that corresponds to an function executed at a user's request, and an alerting screen that alerts the user to an occurrence of an event, a locking screen that is formed for inputting a password to cancel a locked state, and the like. Then the screen information is configured from at least one among text, an image (including an icon), a flash, and a moving image.

On the other hand, here, screen information that is displayed with the pushing gesture varies according to a current state of the portable electronic device, or varies according to the feature of the pushing gesture.

First, the state of the portable electronic device is described in more detail. When the pushing gesture is detected, the controller 180 performs control that varies according to the state of the portable electronic device, such as a function that is currently performed in the portable electronic device, a type of screen information that is currently displayed on the second segment, an application corresponding to the screen information that is currently output on the second segment, or a locked or unlocked state of the portable electronic device.

More specifically, although the same pushing gesture is detected, the controller 180 displays time information or weather information that has no relation to security, in the locked state, as illustrated in FIG. 11A, and performs control of an application associated with the screen information that is currently output, in the unlocked state, as illustrated in FIG. 11B.

As one example, in a state where a message that is received in the unlocked state is displayed on the second segment, it is possible to check a lengthy message because the received message is scrolled through along a direction in which the pushing gesture is applied. In this case, a first message is changed into a second message.

Next, the feature of the pushing gesture is described in more detail. The feature of the pushing gesture is associated with at least one among the number of times that the pushing gesture is applied, a position to which the pushing gesture is applied, strength with which the pushing gesture is applied, a pattern in which the pushing gesture is applied, and a portion to which the pushing gesture is applied. For example, in a case where the pushing gesture is applied one time, first screen information is displayed, and in a case where the pushing gesture is applied tow times, second screen information is displayed.

As one example, referring to FIG. 11C, when the pushing gesture is applied two times, icons corresponding to applications that have been executed most recently are displayed on the second segment, or icons that are set by the user are displayed on the second segment.

In this manner, according to the present invention, the information that is displayed on the second segment is variously controlled using the shape change in the first segment due to an external force in the bent state, and a new type of user convenience is provided according to the conjunctional operation of the first segment and the second segment.

On the other hand, the first segment and the second segment are distinguishable by whether a segment is covered by a cover unit. That is, the first segment and the second segment correspond to a segment that is covered by the cover unit and a segment that is not covered by the cover unit, respectively.

Figure 12A:
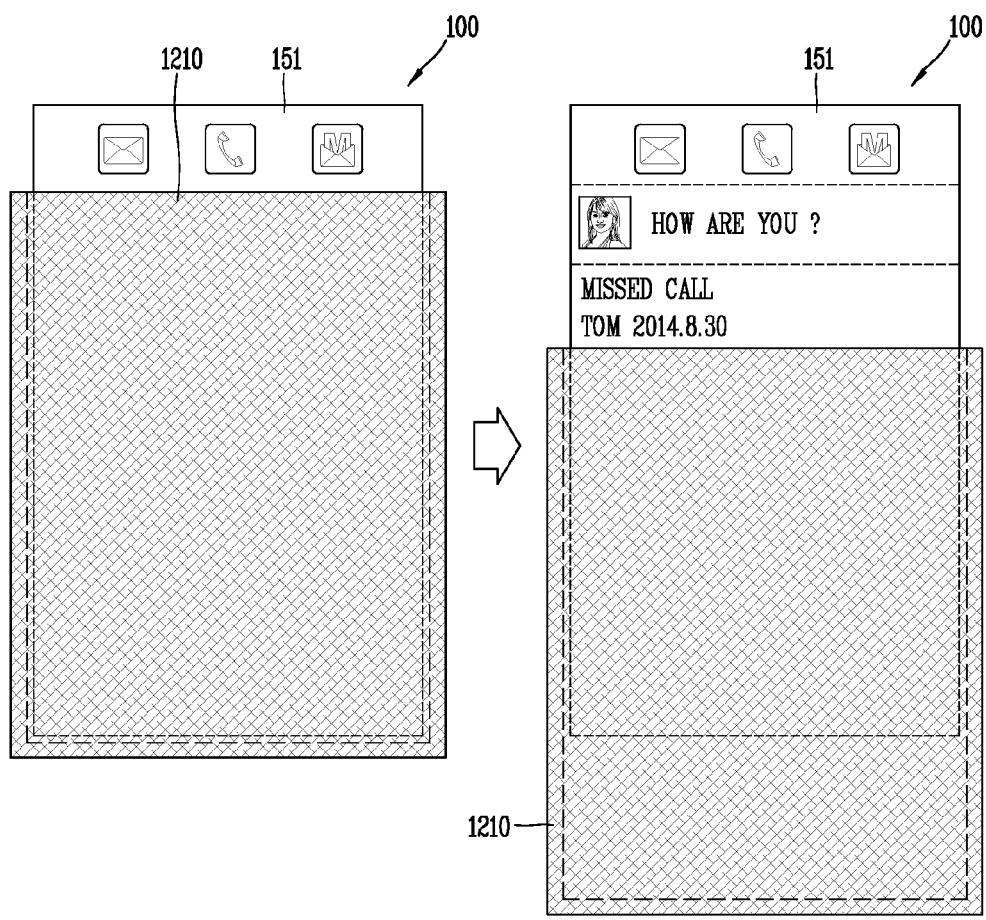
FIGS. 12A and 12B are diagrams for describing a cover unit according to one embodiment of the present invention.

Referring to FIG. 12A, a cover unit 1210 is formed in such a manner that the cover unit 1210 is removably connected to the main body of the portable electronic device 100. The cover unit 1210 is connected to the main body along the longitudinal length of the main body. However, the present invention is not limited to this, and the cover unit 1210, and the cover unit may be formed in such a manner that the cover unit is connected to the main body along one direction. As illustrated in FIG. 14A, the cover unit 1210 that is connected to the main body along the longitudinal direction can be separated from the main body along the connection direction.

FIG. 12A illustrate that the cover unit 1210 is connected to the main body in a manner that slides along the longitudinal length of the main body, but the present invention is not limited to this. The cover unit 1210 is connected to the main body in such a manner that the cover unit 1210 are directed from the front side to the back side of the main body or vice versa. In another example, the cover unit 1210 is connected to the main body by applying a predetermined amount of force or more to the cover unit 1210.

In addition, the cover unit 1210 of the portable electronic device 100 according to the present embodiment is formed to be smaller in length than the main body in such a manner that, in a state where the cover unit 1210 is connection to the main body, the display unit 151 arranged in the front side of the main body is exposed to the outside. Accordingly, although the cover unit 1210 is in a state of being connected to the main body, the user can check an event that occurs in the terminal.

At this time, a segment that is covered by the cover unit 1210 is defined as a first segment, and a segment that is not covered by the cover unit 1210 and thus is exposed to the outside is defined as a second segment. In a case where this definition is applied, the embodiments that are described referring FIGS. 6A to 11C are also applied to the first segment and the second segment.

For example, as illustrated in FIG. 12A, in a case where, with the sliding gesture, the first segment decreases in area and the second segment increases in area, information relating to an event is additionally on the second segment.

Figure 12B:
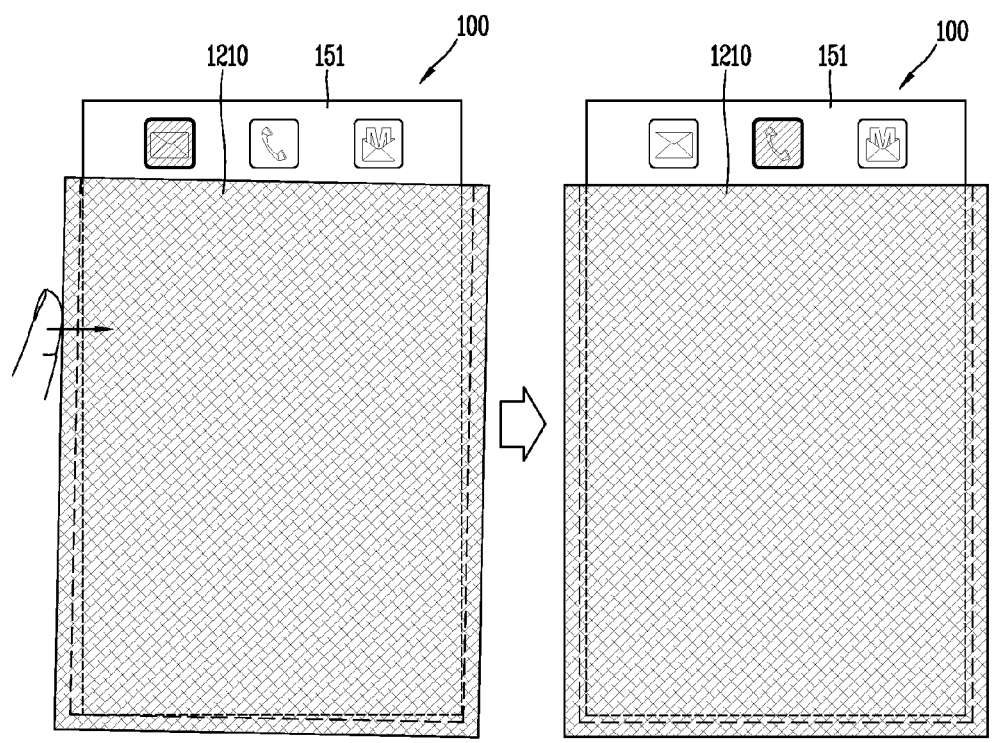

In another example, as illustrated in FIG. 12B, in a case where, with the pushing gesture, one portion of the cover unit corresponding to the first segment is inclined, a function of viewing next-information is performed, or a function of selecting a next-alerting icon is performed. The cover unit 1210 may include a hall sensor or a magnetic member in order to detect the inclination of one end portion of the cover unit due to the pushing gesture.

Accordingly, user convenience is improved because the terminal is controlled by moving the cover unit or by a simple operation.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile electronic device comprising: a flexible display comprising:
    a touch panel configured to be a capacitive type;
    a bendable portion;
    a first display area;
    a second display area; and
    a third display area coupled to one end of the second display area,
    wherein the display is configured such that:
    the first display area and the second display area are configured to be in contact with or close proximity to each other when the display is bent via the bendable portion and comprise a first segment; and a first size of the first segment and a second size of a second segment comprising a third display area are variable based on how the display is bent, the first size increasing when the second size decreases and the first size decreasing when the second size increases; and a controller configured to:

cause the third display area to display a plurality of icons;

detect an area of which the first display area and the second display area are brought into contact with each other via the touch panel;

detect a twist of the first display area with respect to the second display area in a leftward or rightward direction based on an overlapped extent of the detected area; and select an icon among the plurality of icons when the first display area in a twisted state returns to its original state within a predetermined amount of time when an external force for twisting the first display area lapses, wherein the selected icon varies based on whether the detected twist is in the leftward direction or rightward direction.

2. The electronic device of claim 1, wherein the selected icon displayed on the third display area is for informing a user to an event related to an application.

3. The electronic device of claim 2, wherein:

the display is further configured such that the first size is decreased and the second size is increased from a base level to a first level when a first sliding gesture is applied to the first display area; and the controller is further configured to cause the display to display first information relating to a first event on the third display area with the second size increased to the first level, the first event associated with the application.

4. The electronic device of claim 3, wherein the controller is further configured to cause the display to display a different amount of information on the third display area based on the second size that is decreased or increased.

5. The electronic device of claim 4, wherein:

the display is further configured such that the first size is further decreased and the second size is further increased to a second level when a second sliding gesture is applied to the first display area; and the controller is further configured to cause the display to display second information in addition to the first information on the third display area with the second size increased to the second level, the second information relating to a second event.

6. The electronic device of claim 3, wherein:

the third display area is partitioned into a first portion and a second portion;

the icon is displayed in the first portion; and the first information is displayed in the second portion.

7. The electronic device of claim 3, wherein the controller is further configured to cause the display to display an execution screen of the application on the third display area when the second size is increased to a level that is equal to or greater than a reference size.

8. The electronic device of claim 3, wherein: the display is further configured such that the second size is decreased to the base level when a third sliding gesture is applied to the first display area after the first sliding gesture; and the controller is further configured to cause the display to no longer display the first information on the third display area with the second size decreased to the base level.

9. The electronic device of claim 1, wherein:

the information is a call receiving screen displayed in response to a call received from another device; and the controller is further configured to accept or refuse the call based on the direction of the inclination detected while the call receiving screen is displayed on the third display area, the call accepted when the direction is a first direction and the call refused when the direction is a second direction that is substantially opposite of the first direction.

10. The electronic device of claim 1, wherein: the plurality of icons displayed on the third display area are for alerting a user to multiple events related to a plurality of applications, each of the plurality of icons informing an event related to a corresponding one of the plurality of applications; and the controller is further configured to cause the display to selectively display information relating to at least one of the multiple events on the third display area based on the direction of the selected icon.

11. The electronic device of claim 1, further comprising a wireless communication unit configured to receive a signal, wherein the controller is further configured to cause the display to display at least a portion of information received via the wireless communication unit on the third display area.

12. The electronic device of claim 1, further comprising a sensing unit configured to sense inclination of the first display area with respect to the second display area in a leftward or a rightward direction, the inclination caused by an external force applied to the first display area, wherein the controller is further configured to:

detect the inclination via the sensing unit while the bendable portion is in a fixed state in which the display is bent; and execute a first function or a second function with respect to information displayed on the third display area based on a direction of the detected inclination, and wherein the inclination is detected in a state where the first display area and the second display area, which are consisting of one surface, are facing each other.

13. A method of controlling a mobile electronic device comprising a flexible display, wherein:

the flexible display comprises a touch panel configured to be a capacitive type;

a bendable portion;

a first display area;

a second display area; and a third display area connected to one end of the second display area;

the display is configured such that:

the first display area and the second display area are configured to be in contact with or close proximity to each other when the display is bent via the bendable portion and comprise a first segment; and a first size of the first segment and a second size of a second segment comprising the third display area are variable based on how the display is bent, the first size increasing when the second size decreases and the first size decreasing when the second size increases; and the method comprises:

displaying a plurality of icons on the third display area;

detecting an area of which the first display area and the second display area are brought into contact with each other via the touch panel;

detecting a twist of the first display area with respect to the second display area in a leftward or rightward direction based on an overlapped extent of the detected area; and selecting an icon among the plurality of icons when the first display area in a twisted state returns to its original state, when an external force for twisting the first display area lapses, wherein the selected icon varies based on whether the detected twist is in the leftward direction or rightward direction.

14. The method of claim 13, wherein one of the plurality of icons is for informing a user to an event related to an application, the method further comprising:

decreasing the first size and increasing the second size when a sliding gesture is applied to the first display area; and displaying first information relating to a first event on the third display area with the increased second size, the first event associated with the application.

* * * * *